United States Patent
Kawakami

(10) Patent No.: US 12,018,123 B2
(45) Date of Patent: Jun. 25, 2024

(54) DITERMINALLY AMINE-MODIFIED PERFLUOROPOLYETHER COMPOUND AND PREPARATION THEREOF, AND LIQUID-REPELLING COMPOSITION, CURED PRODUCT AND COATED SUBSTRATE CONTAINING THE SAME

(71) Applicant: Shin-Etsu Chemical Co., Ltd., Tokyo (JP)

(72) Inventor: Masato Kawakami, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 559 days.

(21) Appl. No.: 17/387,464

(22) Filed: Jul. 28, 2021

(65) Prior Publication Data
US 2022/0033581 A1 Feb. 3, 2022

(30) Foreign Application Priority Data
Aug. 3, 2020 (JP) .................................. 2020-131637

(51) Int. Cl.
*C08G 65/336* (2006.01)
*C09D 5/00* (2006.01)
*C09D 171/02* (2006.01)

(52) U.S. Cl.
CPC ............ *C08G 65/336* (2013.01); *C09D 5/00* (2013.01); *C09D 171/02* (2013.01)

(58) Field of Classification Search
CPC ....... C08G 65/336; C09D 5/00; C09D 171/02
USPC ....................................................... 524/612
See application file for complete search history.

(56) References Cited

U.S. PATENT DOCUMENTS

| | | |
|---|---|---|
| 10,351,669 B2 | 7/2019 | Guarda et al. |
| 2005/0194588 A1 | 9/2005 | Sasaki et al. |

FOREIGN PATENT DOCUMENTS

| | | | |
|---|---|---|---|
| JP | 2005-200304 A | 7/2005 | |
| JP | 2017-534734 A | 11/2017 | |
| WO | WO-2019088126 A1 * | 5/2019 | ........... C08G 65/007 |

* cited by examiner

*Primary Examiner* — Kelechi C Egwim
(74) *Attorney, Agent, or Firm* — Birch, Stewart, Kolasch & Birch, LLP

(57) ABSTRACT

Diterminally amine-modified perfluoropolyether compounds of the general formula (1)

$$R^6\!\!\setminus\!\!N\!-\!R^5\!-\!\underset{(OR^4)_{2-m}}{\overset{(R^3)_m}{Si}}\!\!-\!\!\left(\!O\!-\!\underset{R^2}{\overset{R^2}{Si}}\!\right)_{\!n}\!\!-\!O\!-\!\underset{R^2}{\overset{R^2}{Si}}\!-\!R^1\!-\!O\!-\!\overset{H_2}{C}\!-\!Rf\!-$$

$$-\overset{H_2}{C}\!-\!O\!-\!R^1\!-\!\underset{R^2}{\overset{R^2}{Si}}\!-\!O\!-\!\left(\!\underset{R^2}{\overset{R^2}{Si}}\!-\!O\!\right)_{\!n}\!\!-\!\underset{(OR^4)_{2-m}}{\overset{(R^3)_m}{Si}}\!-\!R^5\!-\!N\!\!\diagdown\!\!\overset{R^6}{R^6}$$

(wherein Rf is a perfluoropolyether group; each $R^1$ is independently an unsubstituted divalent hydrocarbon group of 1 to 10 carbon atoms; $R^2$, $R^3$ and $R^4$ are each independently substituted or unsubstituted monovalent hydrocarbon groups of 1 to 10 carbon atoms; each $R^5$ is independently an unsubstituted divalent hydrocarbon group of 1 to 10 carbon atoms; each $R^6$ is independently a hydrogen atom or a substituted or unsubstituted monovalent hydrocarbon group of 1 to 50 carbon atoms which may include at least one oxygen, nitrogen, sulfur or silicon atom; each occurrence of 'm' is independently 0, 1 or 2; and each occurrence of 'n' is independently an integer from 0 to 8) are provided. Such compounds have a good solubility in solvents and reactive resins.

8 Claims, 10 Drawing Sheets

DITERMINALLY AMINE-MODIFIED PERFLUOROPOLYETHER COMPOUND AND PREPARATION THEREOF, AND LIQUID-REPELLING COMPOSITION, CURED PRODUCT AND COATED SUBSTRATE CONTAINING THE SAME

CROSS-REFERENCE TO RELATED APPLICATION

This non-provisional application claims priority under 35 U.S.C. § 119(a) on Patent Application No. 2020-131637 filed in Japan on Aug. 3, 2020, the entire contents of which are hereby incorporated by reference.

TECHNICAL FIELD

The present invention relates to a diterminally amine-modified perfluoropolyether compound and a method for preparing the same, and also to a liquid-repelling composition, cured product and coated substrate containing the same.

BACKGROUND ART

Perfluoropolyether groups are building blocks containing a large number of fluorine atoms. Compounds having such a perfluoropolyether group (which compounds are referred to below as "perfluoropolyether compounds"), and coating films and articles obtained from compositions containing such compounds, have a very small surface free energy due to the effect of the many fluorine atoms included on the perfluoropolyether group, and thus exhibit, for example, water and oil repellency, lubricity, releasability and stain-proofing properties. Because of this quality, perfluoropolyether compounds are employed in a broad range of fields, including water and oil repellent finishes, lubricants, oil-proofing agents, cosmetics and protective films.

Perfluoropolyether compounds having functional groups at the ends of the main chain can be used to derive polymers having a perfluoropolyether skeleton by way of copolymerization with a reactive monomer or via reactions with a reactive resin. For example, a perfluoropolyether-modified poly(meth)acrylate resin can be obtained by polymerizing a perfluoropolyether compound having a (meth)acrylic group at the end of the main chain and methyl (meth)acrylate. This makes it possible to impart, in addition to the properties of the polymer itself, the foregoing properties of the perfluoropolyether group. Perfluoropolyether compounds bearing functional groups such as (meth)acrylate, amine, alcohol, isocyanate, epoxy, thiol and vinyl groups and halogen atoms have been developed to date as such functionalized perfluoropolyether compounds.

For example, JP-A 2005-200304 teaches the preparation of a perfluoropolyether compound having a functional group from a silane coupling agent by carrying out transesterification between, as the starting materials, a perfluoropolyether compound having a terminal C—OH structure and a silane coupling agent having a reactive group and thus linking the perfluoropolyether compound with the silane coupling agent through a C—O—Si bond.

Also, an amine-modified perfluoropolyether compound in which a (per)fluoropolyether skeleton and an amino group are coupled through a tetrafluorophenylene group can carry out various transformation reactions using the reactivity-rich amino group and is therefore highly useful. Indeed, a variety of compounds are synthesized using this compound (see JP-A 2017-534734).

However, in the presence of moisture or alcohol, the C—O—Si bond in the perfluoropolyether compound of JP-A 2005-200304 breaks down to C—OH and RO—Si (R here being a hydrogen atom or a hydrocarbon group), posing a problem in terms of durability.

As for the compound described in JP-A 2017-534734, because the spacer site also is fluorinated, the amount of fluorine within the molecule is high, and so the compound appears to have a poor solubility in solvents and resins.

SUMMARY OF THE INVENTION

It is therefore an object of the present invention to provide diterminally amine-modified perfluoropolyether compounds that have a good solubility. Another object of the invention is to provide methods for preparing such compounds. Further objects are to provide liquid-repelling compositions, cured products and coated substrates containing the same.

As a result of extensive investigations, I have discovered that diterminally amine-modified perfluoropolyether compounds in which a perfluoropolyether skeleton and amine groups are coupled through siloxane structures have a good solubility in various types of solvents and reactive resins. I have also found that compositions obtained by mixing such diterminally amine-modified perfluoropolyether compounds with various resins, and cured products of such compositions, exhibit an excellent liquid repellency owing to the perfluoropolyether groups.

Accordingly, one aspect of the invention is directed at a diterminally amine-modified perfluoropolyether compound of general formula (1) below

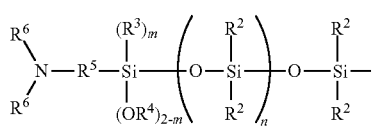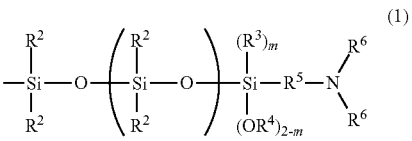 (1)

(wherein Rf is a perfluoropolyether group; each $R^1$ is independently an unsubstituted divalent hydrocarbon group of 1 to 10 carbon atoms; $R^2$, $R^3$ and $R^4$ are each independently substituted or unsubstituted monovalent hydrocarbon groups of 1 to 10 carbon atoms; each $R^5$ is independently an unsubstituted divalent hydrocarbon group of 1 to 10 carbon atoms; each $R^6$ is independently a hydrogen atom or a substituted or unsubstituted monovalent hydrocarbon group of 1 to 50 carbon atoms which may include at least one oxygen, nitrogen, sulfur or silicon atom; each occurrence of 'm' is independently 0, 1 or 2; and each occurrence of 'n' is independently an integer from 0 to 8).

In the perfluoropolyether compound of the invention, it is preferable for each $R^1$ to be independently a substituent of formula (5) or (6) below.

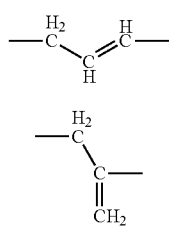

Also, Rf is preferably a divalent group of any one of general formulas (7) to (10) below

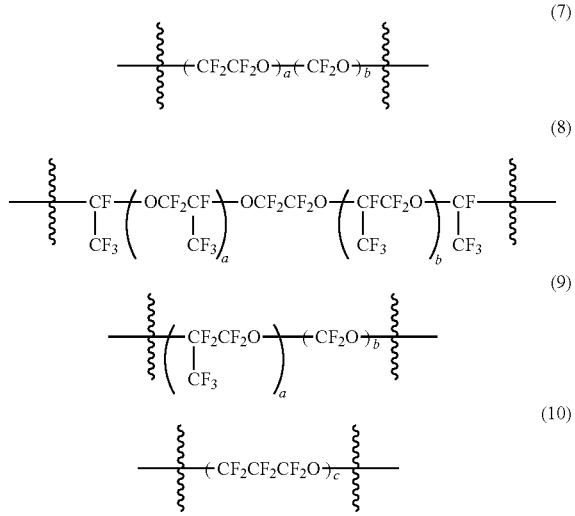

(wherein 'a' and 'b' are each independently an integer from 1 to 50, and 'c' is an integer from 1 to 150).

A second aspect of the invention is directed at a method for preparing the diterminally amine-modified perfluoropolyether compound of the first aspect of the invention, which method includes the step of reacting a diterminally silanol-modified perfluoropolyether compound of general formula (2) below

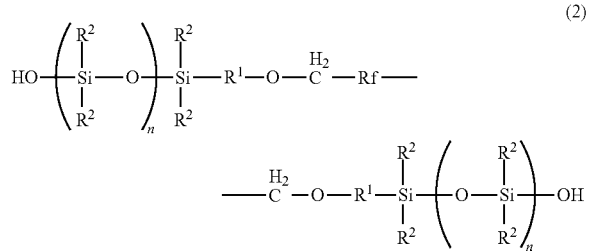

(wherein Rf, $R^1$, $R^2$ and n are as defined above) with a cyclic silazane structure-containing organoxysilane compound of general formula (3) below

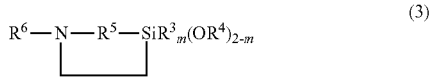

(wherein $R^3$ to $R^6$ and m are as defined above).

A third aspect of the invention is directed at another method for preparing the diterminally amine-modified perfluoropolyether compound of the first aspect of the invention, which method includes the step of reacting a diterminally silanol-modified perfluoropolyether compound of general formula (2) below

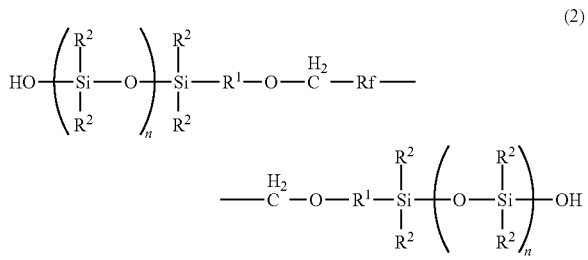

(wherein Rf, $R^1$, $R^2$ and n are as defined above) with an amino group-containing organoxysilane compound of general formula (4) below

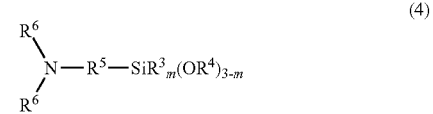

(wherein $R^3$ to $R^6$ and m are as defined above).

Further aspects of the invention are directed at a liquid-repelling composition, a cured product and a coated substrate, each of which include the diterminally amine-modified perfluoropolyether compound of the first aspect of the invention.

Advantageous Effects of the Invention

The diterminally amine-modified perfluoropolyether compound of the invention has a good solubility in various solvents and reactive resins. Cured products created from compositions obtained by mixing together this compound and various reactive resins exhibit an excellent liquid repellency owing to the perfluoropolyether group.

BRIEF DESCRIPTION OF THE DIAGRAMS

DESCRIPTION OF THE PREFERRED EMBODIMENTS

Figure 1:
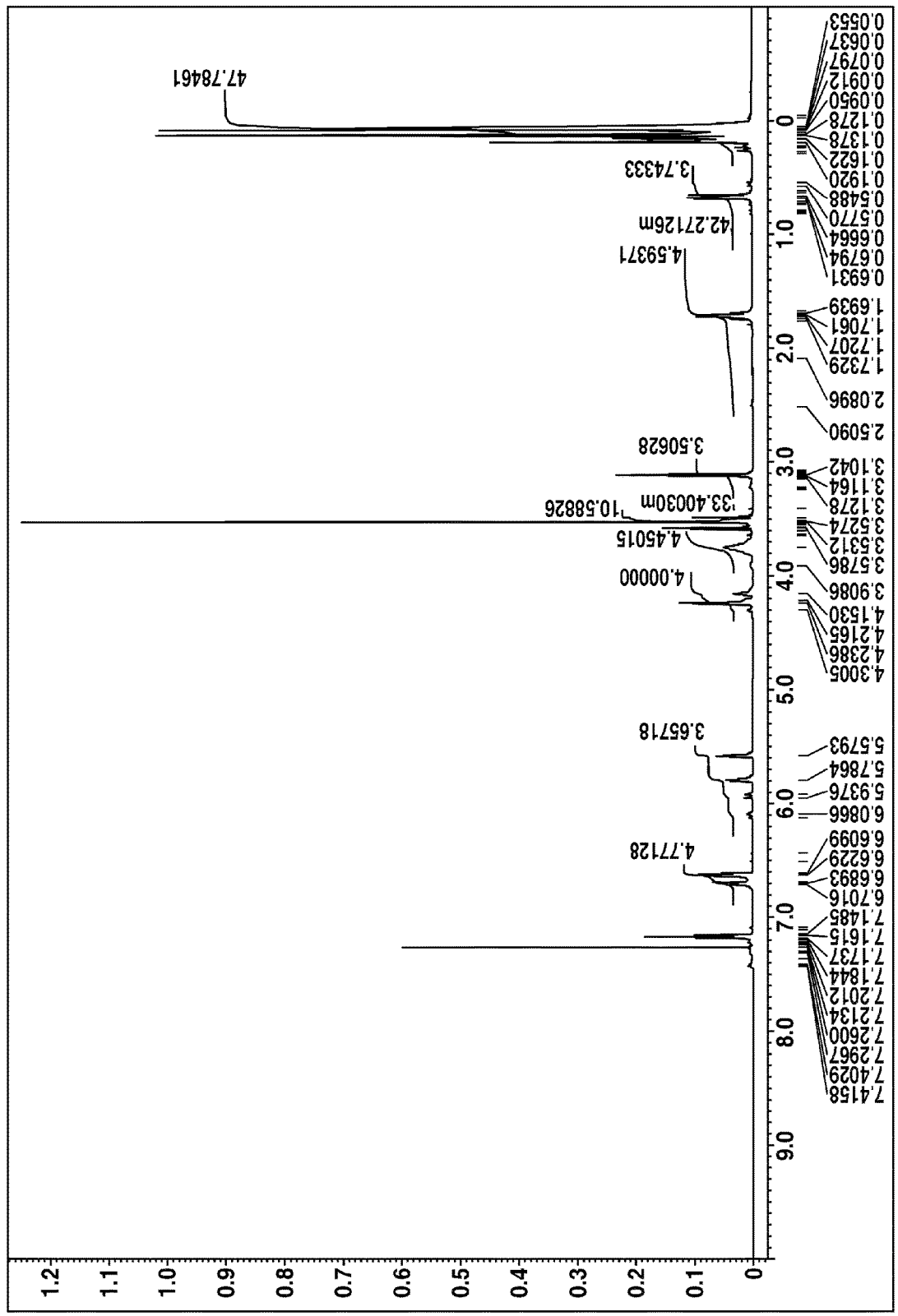
FIG. 1 is an $^1$H-NMR spectrum of Diterminally Amine-Modified Perfluoropolyether Compound 1 obtained in Inventive Example 1-1.

The objects, features and advantages of the invention will become more apparent from the following detailed description taken in conjunction with the appended diagrams.

(1) Diterminally Amine-Modified Perfluoropolyether Compound

The diterminally amine-modified perfluoropolyether compound of the invention (referred to below as "Compound (1)") is represented by general formula (1) below.

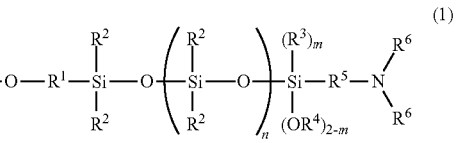
(1)

In general formula (1) and below, Rf stands for a perfluoropolyether group. The perfluoropolyether group is exemplified by, without particular limitation, the divalent groups of general formulas (7) to (10) below.

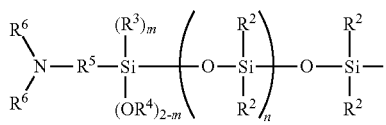

(7)

(8)

(9)

(10)

In general formulas (7) to (9), 'a' and 'b' are each independently an integer from 1 to 50, and preferably from 15 to 40. Also, the sum of 'a' and 'b' is such that $2 \leq a+b \leq 100$, preferably $2 \leq a+b \leq 80$, more preferably $10 \leq a+b \leq 80$, even more preferably $30 \leq a+b \leq 80$, and still more preferably $15 \leq a+b \leq 50$.

In general formula (10), 'c' is an integer from 1 to 150, preferably from 1 to 100, and more preferably from 5 to 80.

In general formula (1), each $R^1$ is independently an unsaturated divalent hydrocarbon group of 1 to 10, preferably 1 to 6, and more preferably 1 to 3, carbon atoms.

Illustrative examples of the divalent hydrocarbon groups represented by $R^1$ include linear alkylene groups such as methylene, ethylene, trimethylene, tetramethylene, hexamethylene, octamethylene and decylene groups; branched alkylene groups such as methylethylene and methyltrimethylene groups; cyclic alkylene groups such as cyclohexylene and methylenecyclohexylenemethylene groups; linear alkenylene groups such as propenylene, butenylene, hexenylene and octenylene groups; branched alkenylene groups such as isopropenylene and isobutenylene groups; arylene groups such as the phenylene group; and aralkylene groups such as methylenephenylene and methylenephenylenemethylene groups.

Of these, from the standpoint of the ease of procuring the starting materials, linear alkylene groups, linear alkenylene groups or branched alkenylene groups are preferred.

The divalent hydrocarbon groups represented by $R^1$ are more preferably groups of formula (5) or (6) below. Compound (1) may be a mixture in which these substituents are combined.

(5)

(6)

$R^2$, $R^3$ and $R^4$ are each independently a substituted or unsubstituted monovalent hydrocarbon group of 1 to 10, preferably 1 to 6, and more preferably 1 to 3, carbon atoms.

Illustrative examples of these monovalent hydrocarbon groups include linear alkyl groups such as methyl, ethyl, n-propyl, n-butyl, n-pentyl, n-hexyl, n-heptyl, n-octyl and decyl groups; branched-chain alkyl groups such as isopropyl, isobutyl, sec-butyl, tert-butyl, neopentyl, decyl and 2-ethylhexyl groups; cyclic alkyl groups such as cyclopentyl and cyclohexyl groups; alkenyl groups such as vinyl, allyl, propenyl, butenyl and pentenyl groups; aryl groups such as phenyl and tolyl groups; and aralkyl groups such as benzyl and phenethyl groups.

Some or all hydrogen atoms on the monovalent hydrocarbon groups represented by $R^2$, $R^3$ and $R^4$ may be substituted with fluorine atoms. Illustrative examples of fluorine-substituted monovalent hydrocarbon groups include fluoroalkyl groups such as (3,3,3-trifluoro)propyl, (3,3,4,4,5,5,6,6,6-nonafluoro)hexyl and (3,3,4,4,5,5,6,6,7,7,8,8,8-tridecafluoro)octyl groups.

Each $R^5$ is independently an unsubstituted divalent hydrocarbon group of 1 to 10, preferably 1 to 6, and more preferably 1 to 3, carbon atoms. The divalent hydrocarbon groups of $R^5$ are exemplified by the same substituents as $R^1$.

Each $R^6$ is independently a hydrogen or a substituted or unsubstituted monovalent hydrocarbon group of 1 to 50, preferably 1 to 20, and more preferably 3 to 20, carbon atoms which may include at least one oxygen, nitrogen, sulfur or silicon atom.

Illustrative examples of the monovalent hydrocarbon groups of $R^6$ include linear alkyl groups such as methyl, ethyl, n-propyl, n-butyl, n-pentyl, n-hexyl, n-heptyl, n-octyl, decyl, dodecyl, tetradecyl, hexadecyl and octadecyl groups; branched-chain alkyl groups such as isopropyl, isobutyl, sec-butyl, tert-butyl, neopentyl, hexyl and 2-ethylhexyl groups; cyclic alkyl groups such as cyclopentyl and cyclohexyl groups; alkenyl groups such as vinyl, allyl, propenyl, butenyl, pentenyl and octenyl groups; aryl groups such as phenyl and tolyl groups; and aralkyl groups such as benzyl, phenethyl, phenylbutyl and phenyloctyl groups.

Illustrative examples of the oxygen, nitrogen sulfur or silicon-containing monovalent hydrocarbon groups of $R^6$ include oxyalkyl groups such as hydroxyethyl, methoxyethyl, ethoxyethyl and methoxypropyl groups; thioalkyl groups such as mercaptoethyl, mercaptopropyl, methylthioethyl and methylthiopropyl groups; aminoalkyl groups such as aminoethyl and aminopropyl groups; alkylaminoalkyl groups such as methylaminoethyl, ethylaminoethyl and 4-piperidinyl groups; dialkylaminoalkyl groups such as dimethylaminoethyl, diethylaminoethyl and morpholinoethyl groups; alkoxysilylalkyl groups such as trimethoxysilylmethyl, trimethoxysilylpropyl, trimethoxysilyloctyl, triethoxysilylmethyl, triethoxysilylpropyl, triethoxysilyloctyl, methyldimethoxysilylpropyl and dimethylmethoxysilylpropyl groups; and alkyl groups having structures exemplified by general formula (11) below.

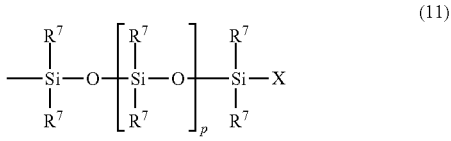

(11)

In general formula (11), $R^7$ is a substituted or unsubstituted monovalent hydrocarbon group of 1 to 10, preferably 1 to 6, carbon atoms. This monovalent hydrocarbon group is exemplified by the same substituents as $R^2$.

X is an alkyl, aminoalkyl or bis(silylamino)alkyl group of 1 to 20, preferably 3 to 10, and more preferably 3 to 8, carbon atoms.

The subscript 'p' is an integer from 0 to 20, preferably from 0 to 10, and more preferably from 0 to 6.

Preferred examples of $R^6$ are aminoethyl groups such as allyl, phenyl, aminoethyl, dimethylaminoethyl, diethylaminoethyl and bis(silylamino)ethyl groups; 4-piperidinyl groups such as 2,2,6,6-tetramethyl-4-piperidinyl, 1,2,2,6,6-pentamethyl-4-piperidinyl and 1-oxy-2,2,6,6-pentamethyl-4-piperidinyl groups; alkoxysilylalkyl groups such as trimethoxysilylpropyl, methyldimethoxysilylpropyl, trimethoxysilylmethyl, triethoxysilylpropyl, methyldiethoxysilylpropyl and triethoxysilylmethyl groups; and the 1-bis(silylamino)propyl-1,1,3,3-tetramethyldisiloxypropyl group.

In general formula (1), 'm' is independently at each occurrence 0, 1 or 2; and 'n' is independently at each occurrence an integer from 0 to 8, preferably from 1 to 7, and more preferably from 1 to 3.

(2) Preparation of Diterminally Amine-Modified Perfluoropolyether Compound

Next, methods for preparing a diterminally amine-modified perfluoropolyether compound of general formula (1) are described.

The diterminally amine-modified perfluoropolyether compound of the invention can be obtained by, for example, reacting a diterminally silanol-modified perfluoropolyether compound of general formula (2) below (referred to below as "Compound (2)") with a cyclic silazane structure-containing organoxysilane compound of general formula (3) below (referred to below as "Compound (3)"); or by reacting Compound (2) with an amino group-containing organoxysilane compound of general formula (4) below (referred to below as "Compound (4)").

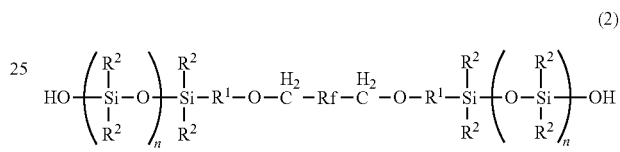

(2)

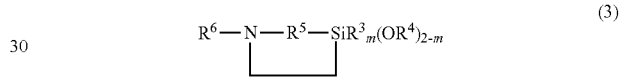

(3)

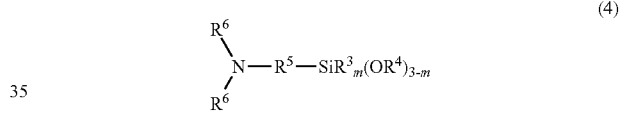

(4)

In Formulas (2) to (4), Rf, $R^1$ to $R^6$, m and n are as defined above.

When the divalent hydrocarbon groups represented by $R^1$ are a mixture in which substituents of formula (5) or (6) are combined, the mixing ratio therebetween can be expressed as the ratio between terminal addition and internal addition. That is, letting "terminal addition" refer to compounds in which silicon is bonded at the terminal carbon on $R^1$ in Compound (2) and "internal addition" refer to compounds in which silicon is bonded at a carbon one or more places in from the end of $R^1$, the proportions of each can be determined by $^1$H-NMR spectroscopy.

The ratio between terminal addition and internal addition, from the standpoint of the stability of the product, is preferably from 10:1 to 1:1, and more preferably from 5:1 to 2:1.

The silanol insertion percentage in Compound (2) is not particularly limited. However, for a higher compatibility with the other compound and the solvent, this is preferably from 50 to 100%, more preferably from 70 to 100%, and even more preferably from 85 to 100%.

The "silanol insertion percentage" used herein is computed as follows.

Silanol insertion percentage=Compound (2) abundance ratio/(Compound (2) abundance ratio+ subsequently described Compound (12) abundance ratio)×100

This silanol insertion percentage can be obtained by, for example, measurement of the $^1$H-NMR spectra for Compounds (2) and (12) and calculation from the peak integration ratio.

Illustrative examples of Compound (2) include the following compounds.

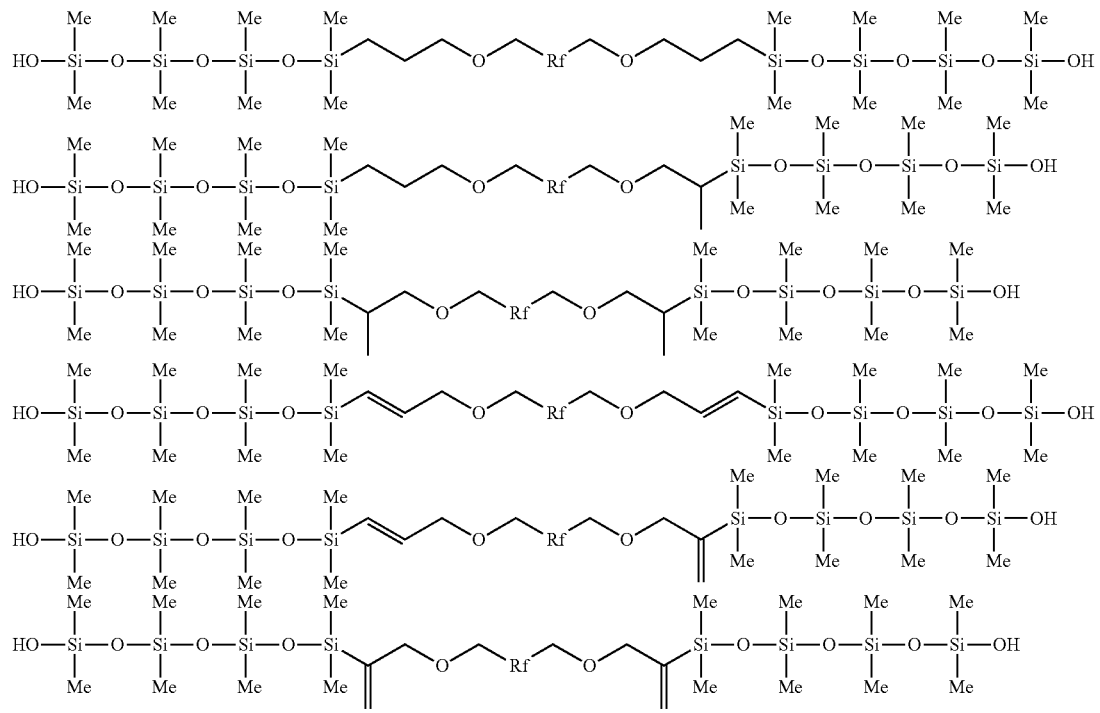

(wherein "Me" represents a methyl groups; the same applies below)

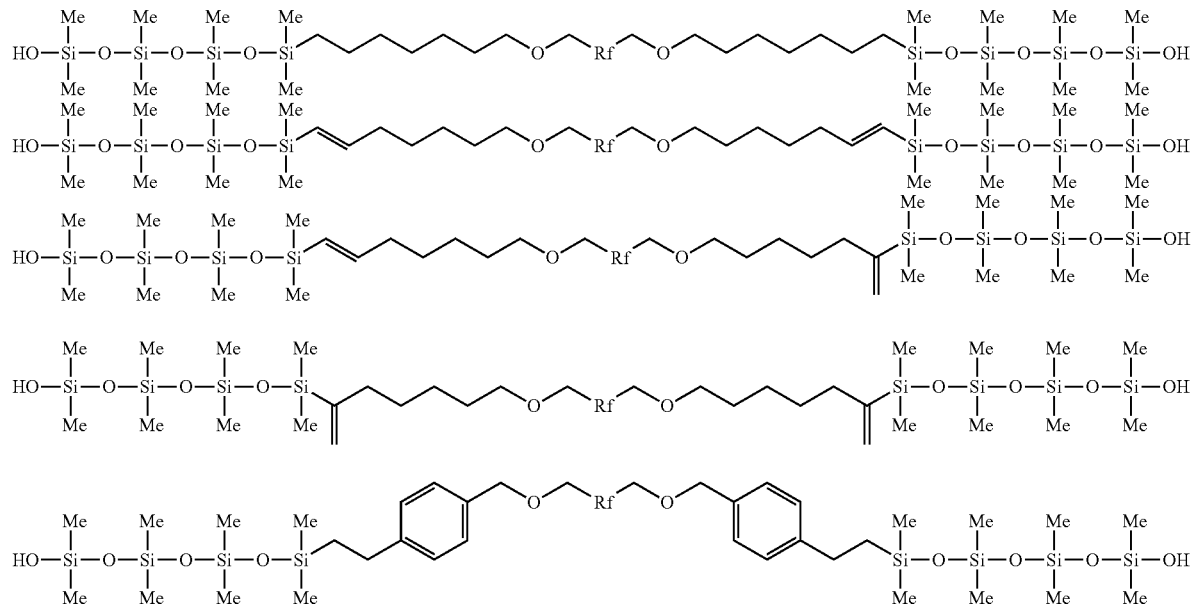

First, preparation by reacting Compound (2) with Compound (3) is described. When obtaining Compound (1) by this method of preparation, one $R^6$ on nitrogen always becomes a hydrogen atom, giving a diterminally amine-modified perfluoropolyether compound of general formula (1') (referred to below as "Compound (1')").

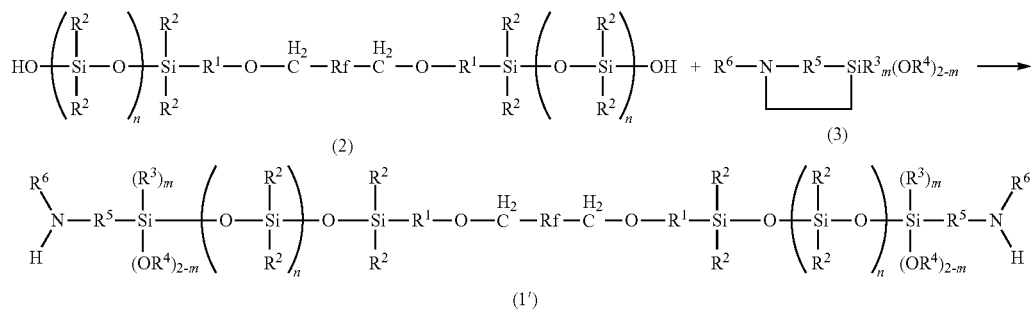

Here, Rf, $R^1$ to $R^6$, m and n in the respective formulas are as defined above.

Compound (2) can be obtained by, for example, reacting a perfluoropolyether compound having unsaturated bonds at both ends of general formula (12) below (referred to below as "Compound (12)") with a silanol group-containing hydrosilane compound of general formula (13) below) (referred to below as "Compound (13)") in the presence of a platinum catalyst.

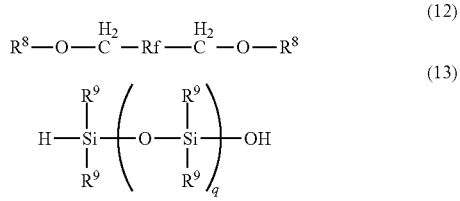

(wherein Rf is as defined above)

In general formula (12), each $R^8$ is independently a monovalent hydrocarbon group of 2 to 10, preferably 3 to 8, carbon atoms which has an unsaturated bond at the end.

Illustrative examples of the monovalent hydrocarbon group represented by $R^8$ include alkenyl groups such as vinyl, allyl (propenyl), butenyl, pentenyl, hexenyl, octenyl and decenyl groups; the phenylenevinyl group; and alkynyl groups such as ethynyl and propargyl groups.

In particular, in terms of being able to achieve a high conversion ratio for the reaction, alkenyl groups of 4 to 8 carbons and alkynyl groups of 3 to 8 carbons are preferred.

Illustrative examples of Compound (12) include the following compounds.

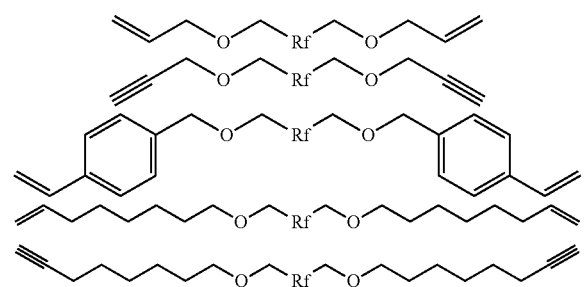

Compound (12) can be obtained by Williams etherification of a dialcohol-terminated perfluoropolyether. For example, Compound (12) can be obtained by reacting a dialcohol-terminated perfluoropolyether compound with an alkali metal or alkaline earth metal hydroxide or hydride to prepare a metal alcoholate, and subsequently reacting this with a halogenated hydrocarbon compound.

In general formula (13), each $R^9$ is independently a substituted or unsubstituted monovalent hydrocarbon group of 1 to 10, preferably 1 to 6, carbon atoms. This monovalent hydrocarbon group is exemplified by the same substituents as $R^2$.

The subscript 'q' is an integer from 0 to 8, preferably from 1 to 7, more preferably from 1 to 5, and even more preferably from 1 to 3.

Illustrative examples of Compound (13) include hydroxydimethylsilane, 1-hydroxy-1,1,3,3-tetramethyldisiloxane, 1-hydroxy-1,1,3,3,5,5-hexamethyltrisiloxane, 1-hydroxy-1,1,3,3,5,5,7,7-octamethyltetrasiloxane and 1-hydroxy-1,1,3,3,5,5,7,7,9,9,11,11,13,13-tetradecamethylheptasiloxane.

The compounding ratio between Compound (12) and Compound (13) is not particularly limited, although the amount of Compound (13) per mole of unsaturated groups in Compound (12) is preferably from 1 to 2 moles, more preferably from 1 to 1.2 moles, and even more preferably from 1 to 1.05 moles.

A platinum compound is used as the catalyst in the reaction between Compound (12) and Compound (13). Illustrative examples of this platinum catalyst include chloroplatinic acid, alcohol solutions of chloroplatinic acid, toluene or xylene solutions of a platinum-1,3-divinyl-1,1,3,3-tetramethyldisiloxane complex, tetrakis(triphenylphosphine)platinum, dichlorobis(triphenylphosphine)platinum, dichlorobis(acetonitrile)platinum, dichlorobis(benzonitrile)platinum, dichloro(cyclooctadiene)platinum and platinum-activated carbon.

The platinum compound is used in an amount which is not particularly limited. However, in terms of productivity, the amount is preferably from 0.000001 to 0.2 mole, and more preferably from 0.00001 to 0.1 mole, per mole of unsaturated bonds included in Compound (12).

The reaction temperature is not particularly limited. However, from the standpoint of the stability of the product, the temperature is preferably between 0 and 200° C., and more preferably between 20 and 150° C. The reaction time also is not particularly limited, but from the standpoint of the stability of the product, is preferably from 1 to 40 hours, and more preferably from 1 to 20 hours.

To prevent catalyst deactivation, the above reaction is preferably carried out in an inert gas atmosphere such as nitrogen or argon.

This reaction proceeds even in the absence of a solvent, although a solvent may be used. Illustrative examples of the solvent include aliphatic hydrocarbon solvents of 5 to 20 carbons, such as pentane, hexane, cyclohexane, heptane, octane, nonane, decane, isooctane and isododecane; aromatic hydrocarbon solvents of 6 to 10 carbons such as benzene, toluene and xylene; ether solvents such as diethyl ether, tetrahydrofuran, dioxane and dipropylene glycol dimethyl ether; ester solvents such as ethyl acetate and butyl acetate; aprotic polar solvents such as acetonitrile, N,N-dimethylformamide and N-methylpyrrolidone; silicone solvents such as hexamethyldisiloxane, octamethyltrisiloxane, decamethyltetrasiloxane, tris(trimethylsiloxy)methylsilane, octamethylcyclotetrasiloxane and decamethylcyclopentasiloxane; and fluorocarbon solvents such as hexafluorobenzene, trifluoromethylbenzene, hexafluoro-m-xylene, nonafluorobutyl methyl ether, nonafluorobutyl ethyl ether and tridecafluorohexyl methyl ether. These solvents may be of one type used alone, or two or more may be used in admixture. To resolve compatibility problems between Compound (12) and Compound (13), fluorocarbon solvents are especially preferred.

Compound (2) obtained by the above reaction can be isolated and purified by suitably selecting and using a method of purification commonly employed in organic synthesis, such as vacuum stripping, any of various chromatographic techniques, treatment using an adsorbent such as activated carbon, or filtration. In particular, to remove or reduce the amount of platinum compound used in the reaction and improve the hue of the product, treatment using an adsorbent is preferred. Following treatment with an adsorbent, it is preferable to remove the adsorbent by filtration.

Compound (3) can be obtained by the dealcoholizing cyclization of, from among compounds of general formula (4), a compound having a primary or secondary amino group.

Examples of Compound (3) include dialkoxysilane compounds having a cyclic silazane structure, such as 2,2-dimethoxy-1-allyl-azasilacyclopentane, 2,2-dimethoxy-1-butyl-azasilacyclopentane, 2,2-dimethoxy-1-octyl-azasilacyclopentane, 2,2-dimethoxy-1-tetradecyl-azasilacyclopentane, 2,2-dimethoxy-1-phenyl-azasilacyclopentane, 2,2-dimethoxy-1-trimethoxysilylmethyl-azasilacyclopentane, 2,2-dimethoxy-1-trimethoxysilylpropyl-azasilacyclopentane, 2,2-dimethoxy-1-(2,2,6,6-tetramethyl-4-piperidinyl)azasilacyclopentane, 2,2-dimethoxy-1-(1,2,2,6,6-pentamethyl-4-piperidinyl)azasilacyclopentane, 2,2-dimethoxy-1-(1-oxy-2,2,6,6-tetramethyl-4-piperidinyl)azasilacyclopentane, 2,2-dimethoxy-1-(aminoethyl)azasilacyclopentane, 2,2-dimethoxy-1-(dimethylaminoethyl)azasilacyclopentane, 2,2-dimethoxy-1-(diethylaminoethyl)azasilacyclopentane, 2,2-diethoxy-1-allyl-azasilacyclopentane, 2,2-diethoxy-1-butyl-azasilacycloepntane, 2,2-diethoxy-1-octyl-azasilacyclopentane, 2,2-diethoxy-1-tetradecyl-azasilacyclopentane, 2,2-diethoxy-1-phenyl-azasilacyclopentane, 2,2-diethoxy-1-triethoxysilylmethyl-azasilacyclopentane, 2,2-diethoxy-1-triethoxysilylpropyl-azasilacyclopentane, 2,2-diethoxy-1-(2,2,6,6-tetramethyl-4-piperidinyl)azasilacyclopentane, 2,2-diethoxy-1-(1,2,2,6,6-pentamethyl-4-piperidinyl)azasilacyclopentane, 2,2-diethoxy-1-(1-oxy-2,2,6,6-tetramethyl-4-piperidinyl)azasilacyclopentane, 2,2-diethoxy-1-(aminoethyl)azasilacyclopentane, 2,2-diethoxy-1-(dimethylaminoethyl)azasilacyclopentane and 2,2-dimethoxy-1-(1-bis(trimethylsilyl)aminopropyl-1,1,3,3-tetramethyldisiloxypropyl)azasilacyclopentane; alkylorganoxysilane compounds having a cyclic silazane structure, such as 2,2-diethoxy-1-(diethylaminoethyl)azasilacyclopentane, 2-methoxy-2-methyl-1-allyl-azasilacyclopentane, 2-methoxy-2-methyl-1-butyl-azasilacyclopentane, 2-methoxy-2-methyl-1-octyl-azasilacyclopentane, 2-methoxy-2-methyl-1-tetradecyl-azasilacyclopentane, 2-methoxy-2-methyl-1-phenyl-azasilacyclopentane, 2-methoxy-2-methyl-1-trimethoxysilylpropyl-azasilacyclopentane, 2-methoxy-2-methyl-1-(2,2,6,6-tetramethyl-4-piperidinyl)azasilacyclopentane, 2-methoxy-2-methyl-1-(1,2,2,6,6-pentamethyl-4-piperidinyl)azasilacyclopentane, 2-methoxy-2-methyl-1-(1-oxy-2,2,6,6-tetramethyl-4-piperidinyl)azasilacyclopentane, 2-methoxy-2-methyl-1-(aminoethyl)azasilacyclopentane, 2-methoxy-2-methyl-1-(dimethylaminoethyl)azasilacylopentane and 2-methoxy-2-methyl-1-(diethylaminoethyl)azasilacyclopentane; and dialkylsilane compounds having a cyclic silazane structure, such as 2,2-dimethoxy-1-allyl-azasilacyclopentane, 2,2-dimethoxy-1-butyl-azasilacyclopentane, 2,2-dimethyl-1-octyl-azasilacyclopentane, 2,2-dimethyl-1-tetradecyl-azasilacyclopentane, 2,2-dimethyl-1-phenyl-azasilacyclopentane, 2,2-dimethyl-1-trimethoxysilylpropyl-azasilacyclopentane, 2,2-dimethyl-1-(2,2,6,6-tetramethyl-4-piperidinyl)azasilacyclopentane, 2,2-dimethyl-1-(1,2,2,6,6-pentamethyl-4-piperidinyl)azasilacyclopentane, 2,2-dimethyl-1-(1-oxy-2,2,6,6-tetramethyl-4-piperidinyl)azasilacyclopentane, 2,2-dimethyl-1-(aminoethyl)azasilacyclopentane, 2,2-dimethyl-1-(dimethylaminoethyl)azasilacyclopentane, 2,2-dimethyl-1-(diethylaminoethyl)azasilacyclopentane, 2,2-diphenyl-1-octyl-azasilacyclopentane, 2,2-diphenyl-1-tetradecyl-azasilacyclopentane, 2,2-diphenyl-1-phenyl-azasilacyclopentane, 2,2-diphenyl-1-trimethoxysilylpropyl-azasilacyclopentane, 2,2-diphenyl-1-(2,2,6,6-tetramethyl-4-piperidinyl)azasilacyclopentane, 2,2-diphenyl-1-(1,2,2,6,6-pentamethyl-4-piperidinyl)azasilacyclopentane, 2,2-diphenyl-1-(1-oxy-2,2,6,6-tetramethyl-4-piperidinyl)azasilacyclopentane, 2,2-diphenyl-1-(aminoethyl)azasilacyclopentane, 2,2-diphenyl-1-(dimethylaminoethyl)azasilacyclopentane and 2,2-diphenyl-1-(diethylaminoethyl)azasilacyclopentane.

The compounding ratio between Compound (2) and Compound (3) is not particularly limited, although the amount of Compound (3) per mole of silanol groups on Compound (2) is preferably from 1 to 2 moles, more preferably from 1 to 1.2 moles, and even more preferably from 1 to 1.05 moles.

The reaction temperature is not particularly limited. However, from the standpoint of the stability of the product, the temperature is preferably between 0 and 200° C., more preferably between 20 and 150° C., and even more preferably between 20 and 60° C. The reaction time also is not particularly limited, but from the standpoint of the stability of the product, is preferably from 5 minutes to 40 hours, more preferably from 10 minutes to 20 hours, and even more preferably from 10 minutes to 5 hours.

To prevent dehydrative condensation of Compound (2) and hydrolysis of Compound (3), the above reaction is preferably carried out in an inert gas atmosphere such as nitrogen or argon.

This reaction proceeds even in the absence of a solvent, although a solvent may be used. The solvent is exemplified by the same solvents as can be used in preparing Compound (2). These solvents may be of one type used alone, or two or more may be used in admixture.

To resolve compatibility problems between Compound (2) and Compound (3), ether solvents, ester solvents and fluorocarbon solvents are especially preferred.

Next, preparation by reacting Compound (2) with Compound (4) is described.

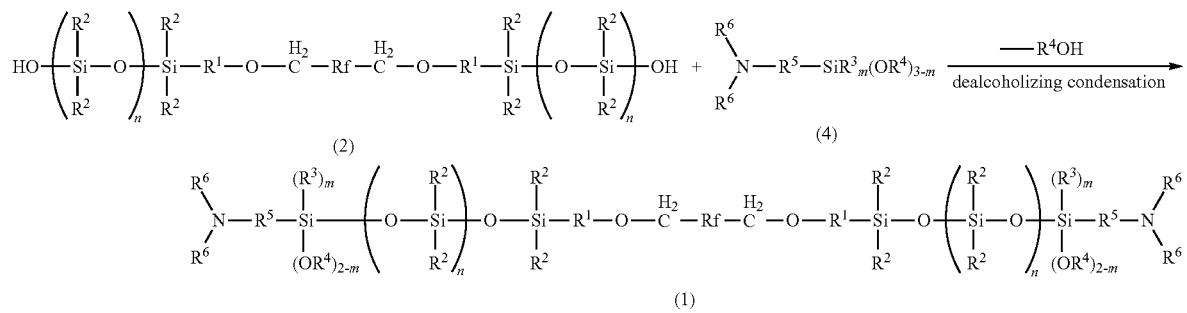

Here, Rf, $R^1$ to $R^6$, m and n in the respective formulas are as defined above.

A commercial product may be used as Compound (4). Illustrative examples include aminoalkyltrialkoxysilane compounds such as aminopropyltrimethoxysilane, aminooctyltrimethoxysilane, aminoethylaminopropyltrimethoxysilane, aminoethylaminooctyltrimethoxysilane, dimethylaminopropyltrimethoxysilane, diethylaminopropyltrimethoxysilane, piperazinopropyltrimethoxysilane, methylpiperazinopropyltrimethoxysilane, morpholinopropyltrimethoxysilane, aminopropyltriethoxysilane, aminooctyltriethoxysilane, aminoethylaminopropyltriethoxysilane, aminoethylaminooctyltriethoxysilane, dimethylaminopropyltriethoxysilane, diethylaminopropyltriethoxysilane, piperazinopropyltriethoxysilane, methylpiperazinopropyltriethoxysilane and morpholinopropyltriethoxysilane; aminoalkylalkyldialkoxysilane compounds such as aminopropylmethyldimethoxysilane, aminooctylmethyldimethoxysilane, aminoethylaminopropylmethyldimethoxysilane, aminoethylaminooctylmethyldimethoxysilane, dimethylaminopropylmethyldimethoxysilane, diethylaminopropylmethyldimethoxysilane, piperazinopropylmethyldimethoxysilane, methylpiperazinopropylmethyldimethoxysilane, morpholinopropylmethyldimethoxysilane, aminopropylmethyldiethoxysilane, aminooctylmethyldiethoxysilane, aminoethylaminopropylmethyldiethoxysilane, aminoethylaminooctylmethyldiethoxysilane, dimethylaminopropylmethyldiethoxysilane, diethylaminopropylmethyldiethoxysilane, piperazinopropylmethyldiethoxysilane, methylpiperazinopropylmethyldiethoxysilane, morpholinopropylmethyldiethoxysilane, aminopropylvinyldimethoxysilane and aminopropylphenyldimethoxysilane; and aminoalkyldialkylalkoxysilane compounds such as aminopropyldimethylmethoxysilane, aminooctyldimethylmethoxysilane, aminoethylaminopropyldimethylmethoxysilane, aminoethylaminooctyldimethylmethoxysilane, dimethylaminopropyldimethylmethoxysilane, diethylaminopropyldimethylmethoxysilane, piperazinopropyldimethylmethoxysilane, methylpiperazinopropyldimethylmethoxysilane, morpholinopropyldimethylmethoxysilane and aminopropyldiphenylmethoxysilane.

The compounding ratio between Compound (2) and Compound (4) is not particularly limited, although the amount of Compound (4) per mole of silanol groups on Compound (2) is preferably from 1 to 2 moles, more preferably from 1 to 1.2 moles, and even more preferably from 1 to 1.05 moles.

The reaction temperature is not particularly limited. However, for the reaction to proceed efficiently by the removal from the reaction system of alcohol that forms due to dealcoholizing condensation, the temperature is preferably between 70 and 200° C., and more preferably between 100 and 150° C. The reaction time also is not particularly limited, but from the standpoint of the stability of the product, is preferably from 1 to 40 hours, and more preferably from 1 to 20 hours.

To prevent dehydrative condensation of the diterminally silanol-modified perfluoropolyether compound and hydrolysis of the amino group-containing organoxysilane compound, the above reaction is preferably carried out in an inert gas atmosphere such as nitrogen or argon.

This reaction proceeds even in the absence of a solvent, although a solvent may be used. The solvent is exemplified by the same solvents as can be used in preparing Compound (2). These solvents may be of one type used alone, or two or more may be used in admixture. To efficiently remove from the reaction system alcohol that forms in the reaction, it is especially preferable to use a solvent which boils at between 70 and 150° C.

Owing to the effects of the amino group on Compound (4), this reaction proceeds even without the addition of a catalyst, although the reaction can be further speeded up by adding a catalyst.

Illustrative examples of the catalyst include Brønsted acids such as methanesulfonic acid, benzenesulfonic acid, dodecylbenzenesulfonic acid, trifluoromethanesulfonic acid, acetic acid, propionic acid, benzoic acid and trifluoroacetic acid.

The amount of catalyst added is not particularly limited. However, from the standpoint of the effects of catalyst addition or of side reactions, the amount per mole of silanol groups in Compound (2) is preferably from 0.001 to 0.1 mole, and more preferably from 0.005 to 0.1 mole.

Compound (1) obtained by the above reaction can be isolated and purified by suitably selecting and using a method of purification commonly employed in organic synthesis, such as vacuum stripping, any of various chromatographic techniques, treatment using an adsorbent such as activated carbon, or filtration. In particular, to remove or reduce the amount of platinum compound used in the reaction and improve the hue of the product, treatment using an adsorbent is preferred. Following treatment with an adsorbent, it is preferable to remove the adsorbent by filtration.

(3) Liquid-Repelling Composition, Cured Product and Coated Substrate

Next, the liquid-repelling composition, cured product and coated substrate of the invention are described.

The liquid-repelling composition includes Component (1) and may optionally include a solvent, a reactive resin and other additives.

The Component (1) content in the liquid-repelling composition, although not particularly limited, is preferably from 0.1 to 80 wt %, and more preferably from 0.5 to 60 wt %.

The solvent is exemplified by the same solvents as those which can be used above in preparing Compound (2). However, from the standpoint of the solubility of the liquid-repelling composition, aromatic hydrocarbon solvents, ether solvents and ester solvents are preferred. These solvents may be of one type used alone or two or more may be used in admixture.

The reactive resin may be suitably selected from among commercially available reactive resins, although isocyanate resins, epoxy resins and hydrolyzable group-containing silicone compounds are preferred.

Polyisocyanate compounds having two or more isocyanate groups on the molecule are preferred as the isocyanate resins. Specific examples of such compounds include aromatic polyisocyanates such as 2,4-tolylene diisocyanate, 2,6-tolylene diisocyanate, 4,4'-diphenylmethane diisocyanate, 2,2'-diphenylmethane diisocyanate, 2,4'-diphenylmethane diisocyanate, 1,4-phenylene diisocyanate, polymethylene polyphenylene polyisocyanate, and polymers thereof; aliphatic polyisocyanates such as hexamethylene diisocyanate, trimethylhexamethylene diisocyanate, lysine diisocyanate, norbornane diisocyanate, tris(isocyanatohexyl) isocyanurate, and polymers thereof; and alicyclic polyisocyanates such as trans-cyclohexane-1,4-diisocyanate, isophorone diisocyanate, bis(isocyanatomethyl) cyclohexane, dicyclohexylmethane diisocyanate, and polymers thereof. These polyisocyanate compounds may be used singly or two or more may be used in combination.

Where necessary, a urethane bond-forming polyol compound and a catalyst that promotes a urethane-forming reaction may also be added to the isocyanate resin.

The polyol compound is not particularly limited, so long as it is a compound having at least two hydroxyl groups on the molecule. Specific examples of polyol compounds include $C_{3-10}$ alkanediols such as 1,4-butanediol, and also polypropylene ether diol, polyethylene ether diol, polypropylene ether triol, polytetramethylene glycol, polyethylene glycol (PEG), polypropylene glycol (PPG), polyoxyethylene glycol, polyoxypropylene glycol, polyoxypropylene triol, polyoxybutylene glycol, polytetramethylene ether glycol (PTMG) and polymer polyols. These polyol compounds may each be used singly or two or more may be used in combination.

The polyol compound content, although not particularly limited, is preferably from 0.5 to 3 equivalents, and more preferably from 1 to 1.5 equivalents, of hydroxyl groups on the polyol compound per isocyanate group on the isocyanate resin.

Metal compounds such as titanium compounds, aluminum compounds and tin compounds may be used as catalysts for promoting the urethane forming reaction.

Specific examples of titanium compounds include tetraalkyl orthotitanates such as tetrabutyl orthotitanate, tetramethyl orthotitanate, tetraethyl orthotitanate, tetrapropyl orthotitanate and tetraisopropyl orthotitanate, partial hydrolytic condensates of these, and titanium acylates.

Examples of aluminum compounds include aluminum trihydroxide, aluminum alcoholates, aluminum acylates, salts of aluminum acylates, aluminosiloxy compounds and aluminum metal chelate compounds.

Examples of tin compounds include dioctyltin dioctoate and dioctyltin dilaurate.

The catalyst content is not particularly limited. However, from the standpoint of fully obtaining the catalyst effects, the content is preferably from 0.01 to 10%, and more preferably from 0.1 to 5%, of the polyol compound.

The epoxy resin is preferably a polyepoxy compound having at least two epoxy groups on the molecule. Specific examples of such compounds include bisphenol A epoxy resins, bisphenol F epoxy resins, novolak epoxy resins, and aliphatic, alicyclic and glycidyl epoxy resins. Each of these may be used singly or two or more may be used in admixture.

Also, a curing agent which reacts with the epoxy resin and a catalyst that promotes the reaction of the curing agent with epoxy groups on the epoxy resin may also be added and used as part of the resin composition.

Examples of curing agents include aliphatic polyamine compounds such as diethylenetriamine, triethylenetetramine, tetraethylenepentamine, dipropylenediamine, N-aminoethylpiperazine, menthenediamine and isophoronediamine; aromatic amine compounds such as m-xylenediamine, m-phenylenediamine, diaminodiphenylmethane and diaminodiphenylsulfone; tertiary or secondary amine compounds such as piperidine, N,N-dimethylpiperazine, triethylenediamine, benzyldimethylamine, 2-(dimethylaminomethyl)phenol and 2,4,6-tris(dimethylaminomethyl)phenol; polymercaptans; polysulfide resins; and acid anhydrides such as methylcyclohexenedicarboxylic anhydride, methylnorbornenedicarboxylic anhydride, phthalic anhydride, trimellitic anhydride, pyromellitic anhydride, benzophenonetetracarboxylic anhydride, maleic anhydride, tetrahydrophthalic anhydride and succinic anhydride.

The content of the curing agent, although not particularly limited, is preferably from 5 to 150 wt %, and more preferably from 10 to 100 wt %, based on the weight of the epoxy resin.

Specific examples of catalysts include Lewis acids such as boron trifluoride, zinc chloride, zinc tetrachloride, iron oxide, aluminum chloride, and amine complexes of these; UV and other photoacid generators such as diphenyliodonium hexafluorophosphate and triphenylsulfonium hexafluorophosphate; and imidazole compounds such as 2-methylimidazole, 2-ethyl-4-methylimidazole, and metal salts thereof.

The curing agent content, although not particularly limited, is preferably from 0.1 to 5 wt %, and more preferably from 1 to 5 wt %, based on the weight of the epoxy resin.

Specific examples of hydrolyzable group-containing silicone compounds include dialkyldialkoxysilane compounds such as dimethyldimethoxysilane, dimethyldiethoxysilane, diphenyldimethoxysilane, diphenyldiethoxysilane and dicyclopentyldimethoxysilane; alkyltrialkoxysilane compounds such as methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, octyltrimethoxysilane, octyltriethoxysilane, decyltrimethoxysilane, decyltriethoxysilane, methoxymethyltrimethoxysilane, ethoxymethyltriethoxysilane, phenyltrimethoxysilane and phenyltriethoxysilane; and partial hydrolytic condensates of these silane compounds.

The partial hydrolytic condensates of silane compounds may be partial hydrolytic condensates of one silane compound or partial hydrolytic condensates of two or more silane compounds.

Also, the hydrolyzable group-containing silicone compound may be a silane compound used directly as is, a partial hydrolytic condensate of a silane compound, or a mixture of a silane compound with a partial hydrolysate thereof.

If necessary, a catalyst that promotes a hydrolytic condensation reaction may also be added to the hydrolyzable group-containing silicone compound. The catalyst is exemplified by metal compounds similar to the catalysts that promote a urethane-forming reaction.

The liquid-repelling composition of the invention may include one or more other additive selected from among pigments, antifoaming agents, lubricants, preservatives, pH adjusters, film-forming agents, antistatic agents, antimicrobial agents and dyes, provided that doing so does not detract from the advantageous effects of the composition.

The cured product of the invention is obtained by curing the above liquid-repelling composition. Specifically, curing occurs via the reaction of the amino groups on Compound (1) included in the liquid-repelling composition with functional groups on the reactive resin and also additives.

When a solvent is included in the liquid-repelling composition, the solvent may or may not be evaporated off prior to curing, or curing may be carried out while evaporating off the solvent.

Curing may be carried out at normal temperature or under heating. The temperature at this time is not particularly limited, so long as it does not adversely affect the substrate. However, to maintain reactivity, the temperature is preferably between 0 and 250° C., more preferably between 20 and 180° C., and even more preferably between 20 and 150° C.

In cases where the $R^6$ moieties in Compound (1) are hydrolyzable group-containing monovalent hydrocarbon groups such as trialkoxysilyl, alkyldialkoxysilyl or dialkylalkoxysilyl groups, a cured product can be obtained also by having moisture in the air react with the hydrolyzable groups to effect hydrolytic condensation. The curing temperature in this case is the same as that indicated above. Because reaction with moisture in air is involved, it is desirable to carry the reaction out at a relative humidity of preferably from 15 to 100%, and more preferably from 25 to 80%.

Next, a coated substrate having a coating film obtained from a liquid-repelling composition is described. A coated substrate having a coating film formed with a liquid-repelling composition can be obtained by coating the above-described liquid-repelling composition onto the surface of a substrate made of, for example, an inorganic material or an organic material, and then curing the composition.

Examples of inorganic materials include metal, glass, silica, alumina, talc, calcium carbonate and carbon. These materials have a shape which, although not particularly limited, may in the form of a plate, sheet, fibers, powder or the like.

In the case of glass, commonly used types of glass, such as E-glass, C-glass or silica glass may be used. The glass may even be fiberglass, which fiberglass may be in the form of, for example, an assemblage of glass filaments having a fiber diameter of 3 to 30 μm, such as a tow, yarn or fabric.

Specific examples of organic materials include resin materials such as polyethylene, polypropylene, polystyrene, poly(meth)acrylate, polyvinyl chloride, polycarbonate, nylon, polyurethane, polybutylene terephthalate, polyethylene terephthalate, ABS (a polymer of acrylonitrile, butadiene and styrene), melamine, phenol, epoxy and polyimide; and elastomers and rubber materials such as polybutadiene rubber, polyisopropylene rubber, nitrile rubber, neoprene rubber, polysulfide and urethane rubber. Polyethylene terephthalate and polycarbonate are especially preferred.

The shape of the substrate is not particularly limited, and may be in a plate-like, sheet-like, fibrous or powdered form.

A known coating method may be used as the method for applying the liquid-repelling composition onto the substrate. For example, brush coating, sponge coating, application with a cloth, spray coating, wire bar coating, blade coating, roll coating, dipping or spin coating may be employed.

Also, in the case of powdery materials such as silica, alumina, talc and calcium carbonate, use can be made of a mixing method that directly mixes the liquid-repelling composition together with the substrate in a mixer or a mill.

EXAMPLES

The following Synthesis Examples, Inventive Examples and Application Examples are provided to illustrate the invention, but are not intended to limit the scope thereof.

Synthesis Example 1

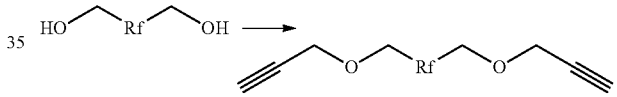

The interior of a four-neck glass flask equipped with a stirrer, a thermometer and a reflux condenser was flushed with nitrogen, charged with 394.3 g of a dialcohol-terminated perfluoropolyether (OH equivalence, 0.4231 mol; Fomblin D2, from Solvay Specialty Polymers; this being a compound of general formula (7) above in which a=8 to 9 and b=8 to 9), 176.2 g (2.114 mol) of a 48 wt % aqueous solution of sodium hydroxide and 106 g of water, and the flask contents were stirred at 60° C. for one hour. Next, 151.3 g (1.269 mol) of propargyl bromide was added dropwise at the same temperature over 30 minutes, following which stirring was carried out at the same temperature for 6 hours. The reaction mixture was then cooled, 432 g of water and 216 g of m-xylene hexafluoride (MXHF) were added, and the system was stirred at room temperature for one hour. At this point, the reaction mixture separated into two phases. The bottom phase was washed with 430 g of 5 wt % hydrochloric acid. The solvent was removed from the resulting bottom phase, giving 372 g of a perfluoropolyether compound having unsaturated bonds at both ends.

Synthesis Example 2

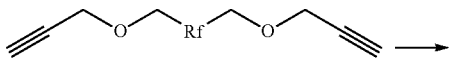

-continued

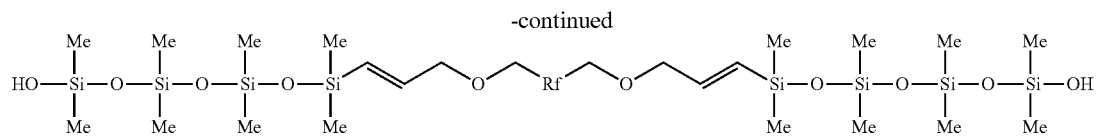

The interior of a four-neck glass flask equipped with a stirrer, a thermometer and a reflux condenser was flushed with nitrogen, charged with 97.0 g of the perfluoropolyether compound having unsaturated bonds at both ends obtained in Synthesis Example 1 (corresponding to 0.1 mol of unsaturated bonds), 97.0 g of MXHF and 0.13 g of a 3 wt % toluene solution of platinum-1,3-divinyltetramethyldisiloxane complex (platinum basis, 0.000020 mol), and the flask contents were heated to 80° C. After the internal temperature had stabilized, a mixture of 30.5 g (0.102 mol) of 1-hydroxy-1,1,3,3,5,5,7,7-octamethyltetrasiloxane and 30.5 g of MXHF was added dropwise over 8 hours and the system was stirred at the same temperature for 1 hour.

The $^1$H-NMR and IR spectra of the reaction mixture were measured at this point. In the $^1$H-NMR spectrum, the peaks near 2.1 ppm attributable to the terminal alkynes vanished and peaks attributable to double bonds that arose at 5.5-6.2 ppm were observed. In the IR spectrum as well, the alkyne peak (3320 cm$^{-1}$) vanished.

These results confirmed the formation of a diterminally silanol-modified perfluoropolyether compound, and 252 g of an MXHF solution containing the diterminally silanol-modified perfluoropolyether compound was obtained.

Inventive Example 1-1

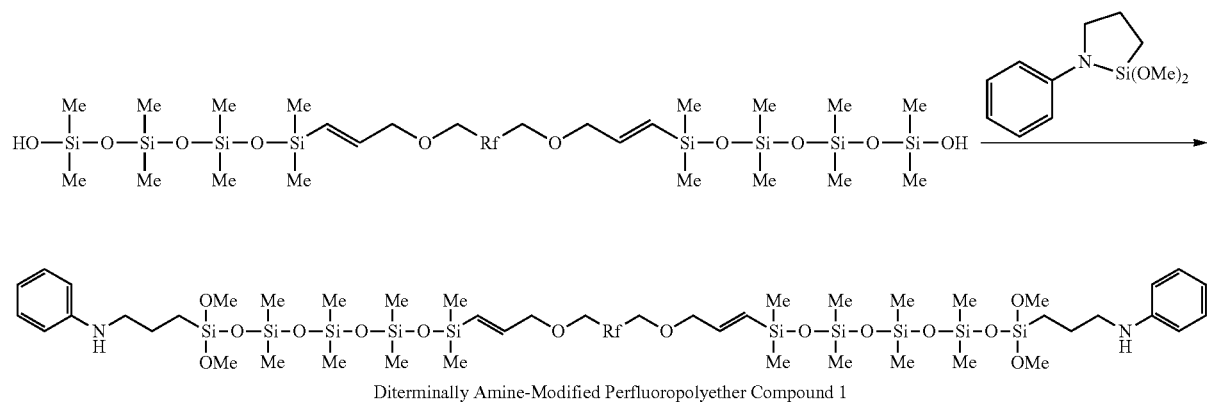

Diterminally Amine-Modified Perfluoropolyether Compound 1

Figure 2:
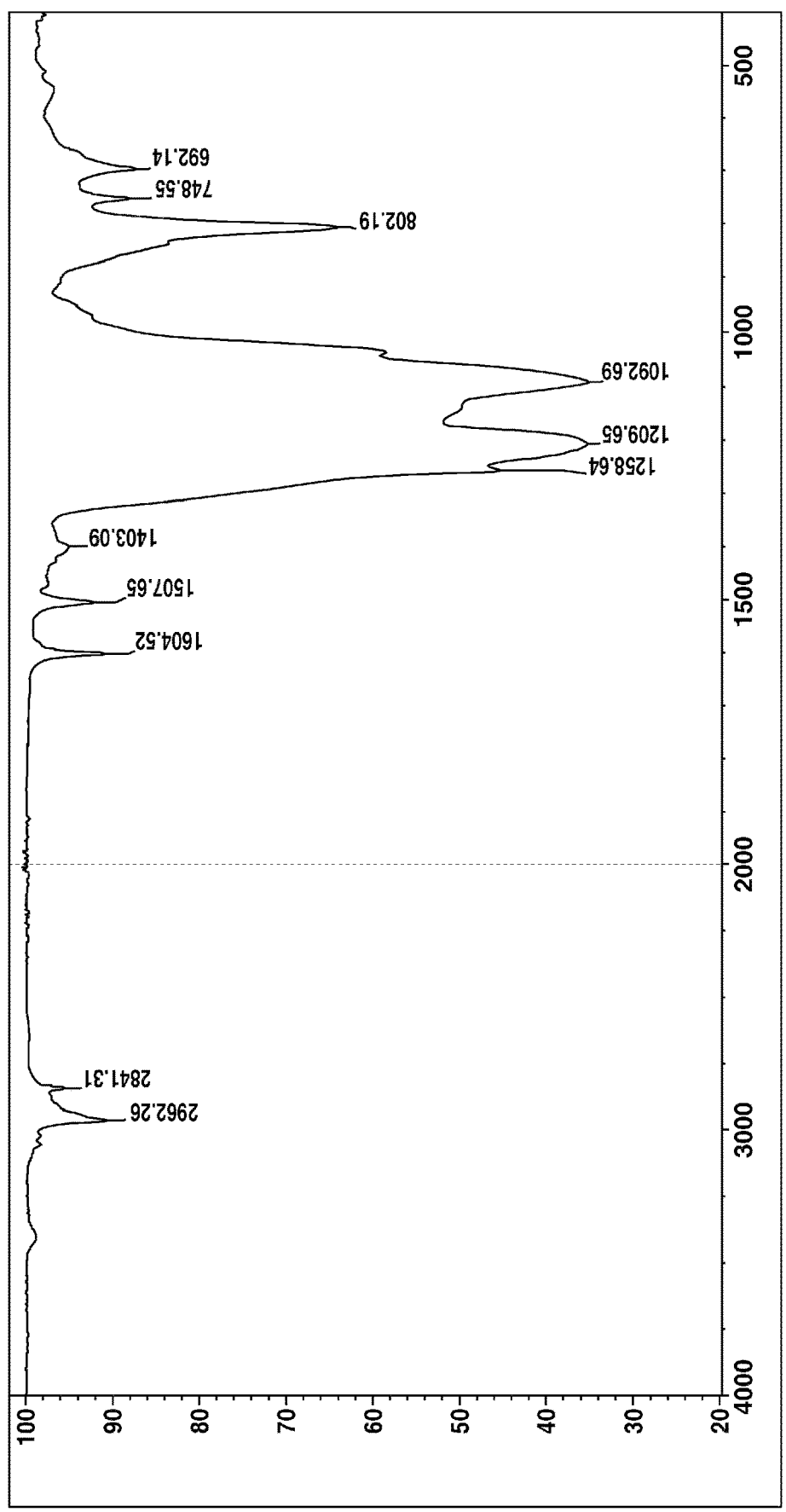
FIG. 2 is an IR spectrum of Diterminally Amine-Modified Perfluoropolyether Compound 1 obtained in Inventive Example 1-1.

The interior of a four-neck glass flask equipped with a stirrer, a thermometer and a reflux condenser was flushed with nitrogen, charged with 28.4 g of the diterminally silanol-modified perfluoropolyether compound-containing MXHF solution obtained in Synthesis Example 2 and 2.24 g (0.0100 mol) of 2,2-dimethoxy-1-phenylazasilacyclopentane, and the flask contents were stirred at room temperature for 1 hour. The resulting mixture was subjected to gas chromatographic (GC) analysis, from which it was confirmed that the peaks attributable to the 2,2-dimethoxy-1-phenylazasilacyclopentane had vanished. The MXHF serving as the solvent was then driven off under reduced pressure, giving 15.7 g of residue. The $^1$H-NMR and IR spectra of this residue are shown in FIGS. 1 and 2. The formation of Diterminally Amine-Modified Perfluoropolyether Compound 1 was confirmed from the disappearance of the Si—OH peaks and the appearance of peaks attributable to NH.

Inventive Example 1-2

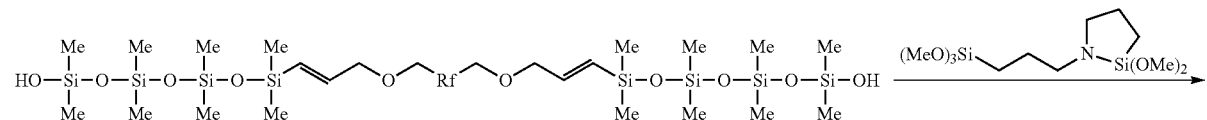

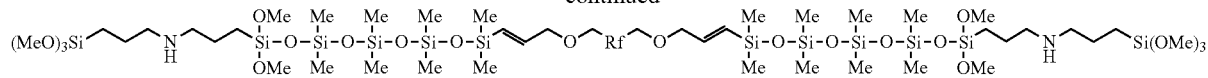

Diterminally Amine-Modified Perfluoropolyether Compound 2

Figure 3:
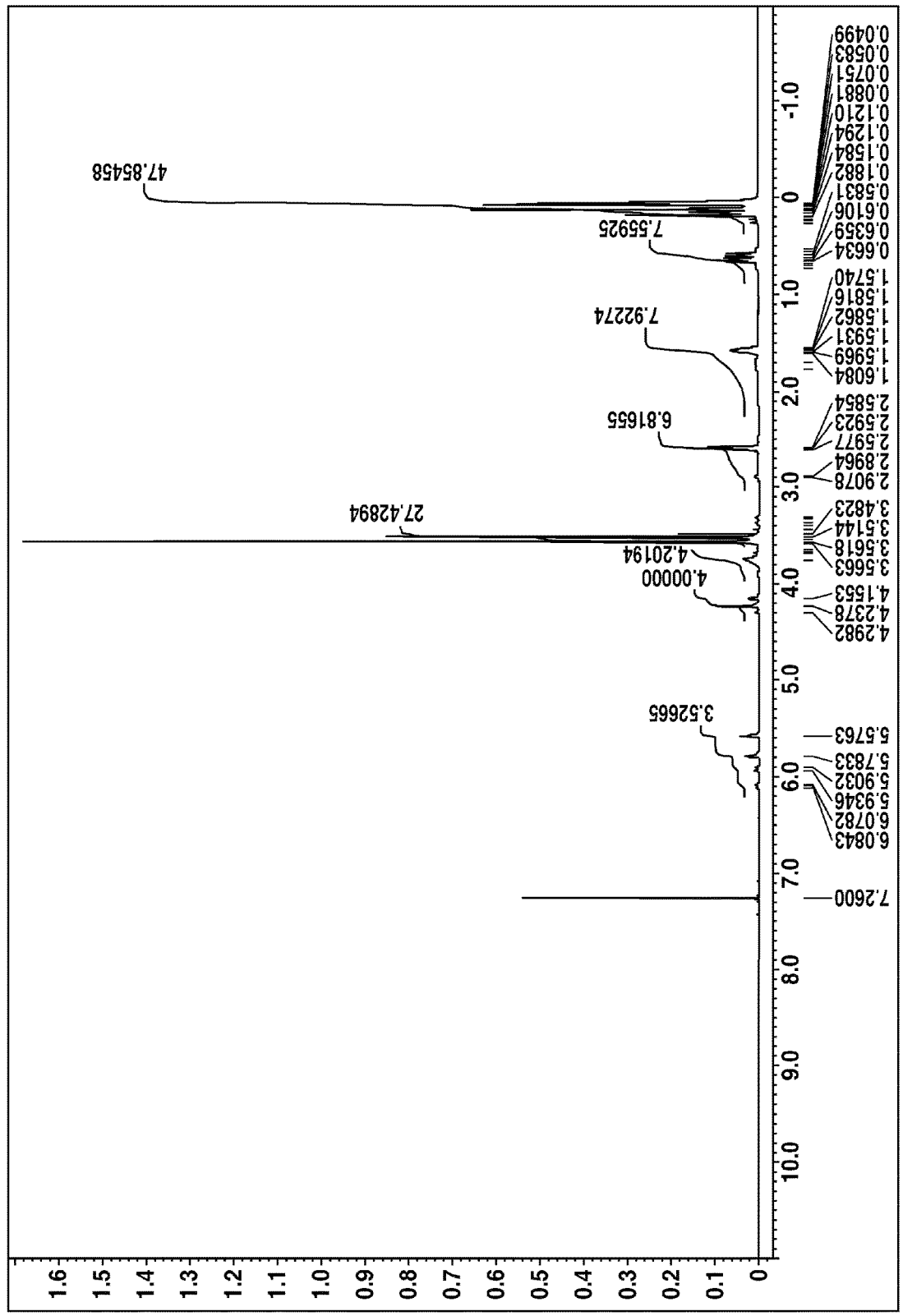
FIG. 3 is an $^1$H-NMR spectrum of Diterminally Amine-Modified Perfluoropolyether Compound 2 obtained in Inventive Example 1-2.
Figure 4:
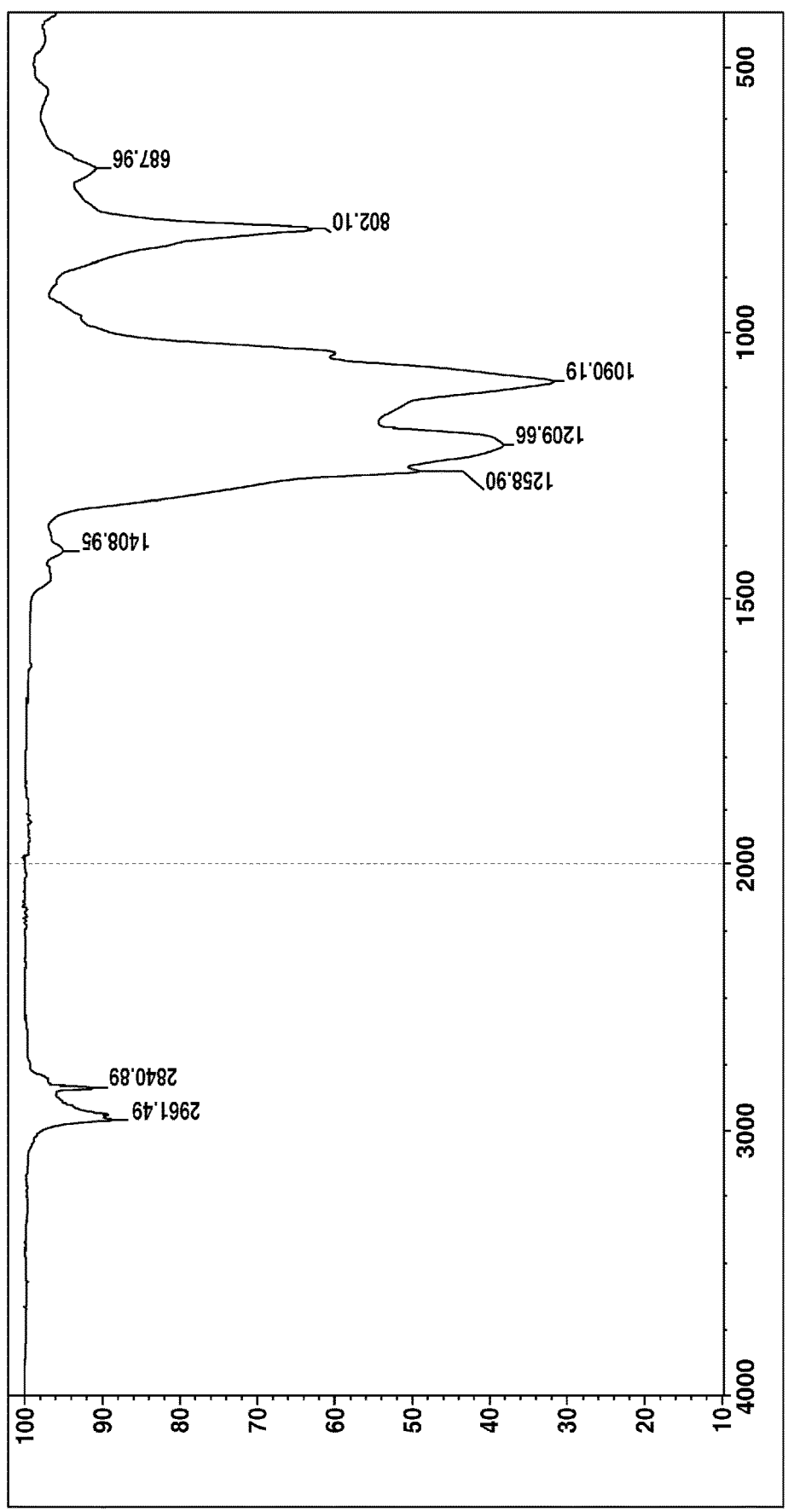
FIG. 4 is an IR spectrum of Diterminally Amine-Modified Perfluoropolyether Compound 2 obtained in Inventive Example 1-2.

Aside from changing the 2,2-dimethoxy-1-phenylazasilacylopentane to 3.10 g (0.0100 mol) of 2,2-dimethoxy-1-(trimethoxysilylpropyl)azasilacylopentane, the reaction was carried out in the same way as in Inventive Example 1-1, giving 16.5 g of residue. The $^1$H-NMR and IR spectra of this residue are shown in FIGS. 3 and 4. The formation of Diterminally Amine-Modified Perfluoropolyether Compound 2 was confirmed from the disappearance of the Si—OH peaks and the appearance of peaks attributable to NH.

Inventive Example 1-3

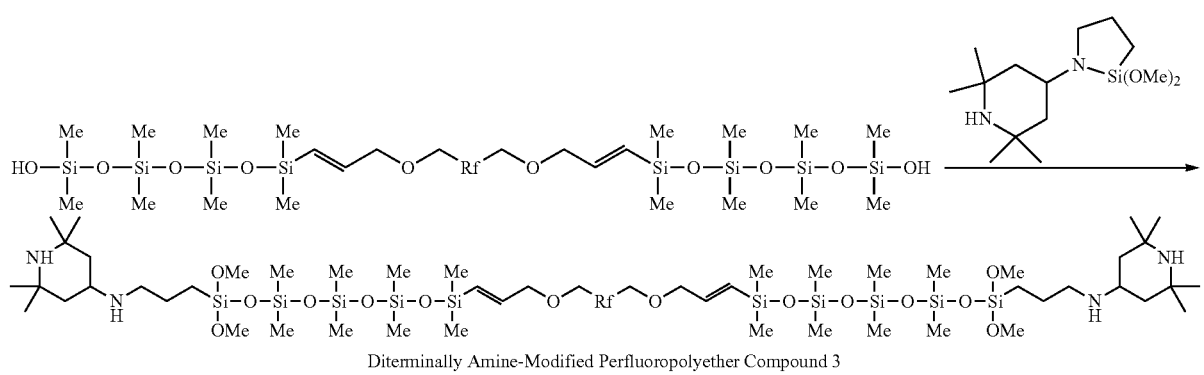

Diterminally Amine-Modified Perfluoropolyether Compound 3

Figure 5:
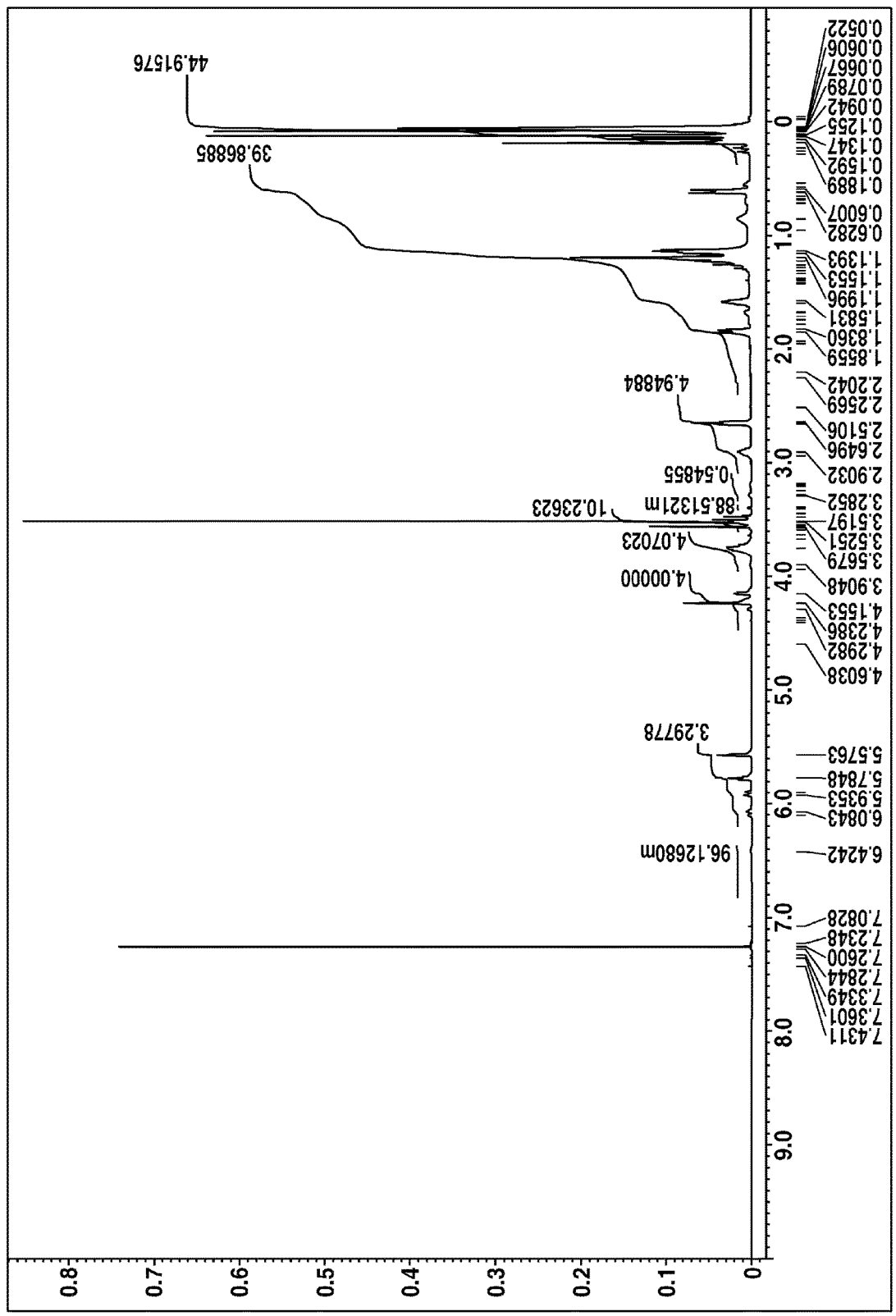
FIG. 5 is an $^1$H-NMR spectrum of Diterminally Amine-Modified Perfluoropolyether Compound 3 obtained in Inventive Example 1-3.
Figure 6:
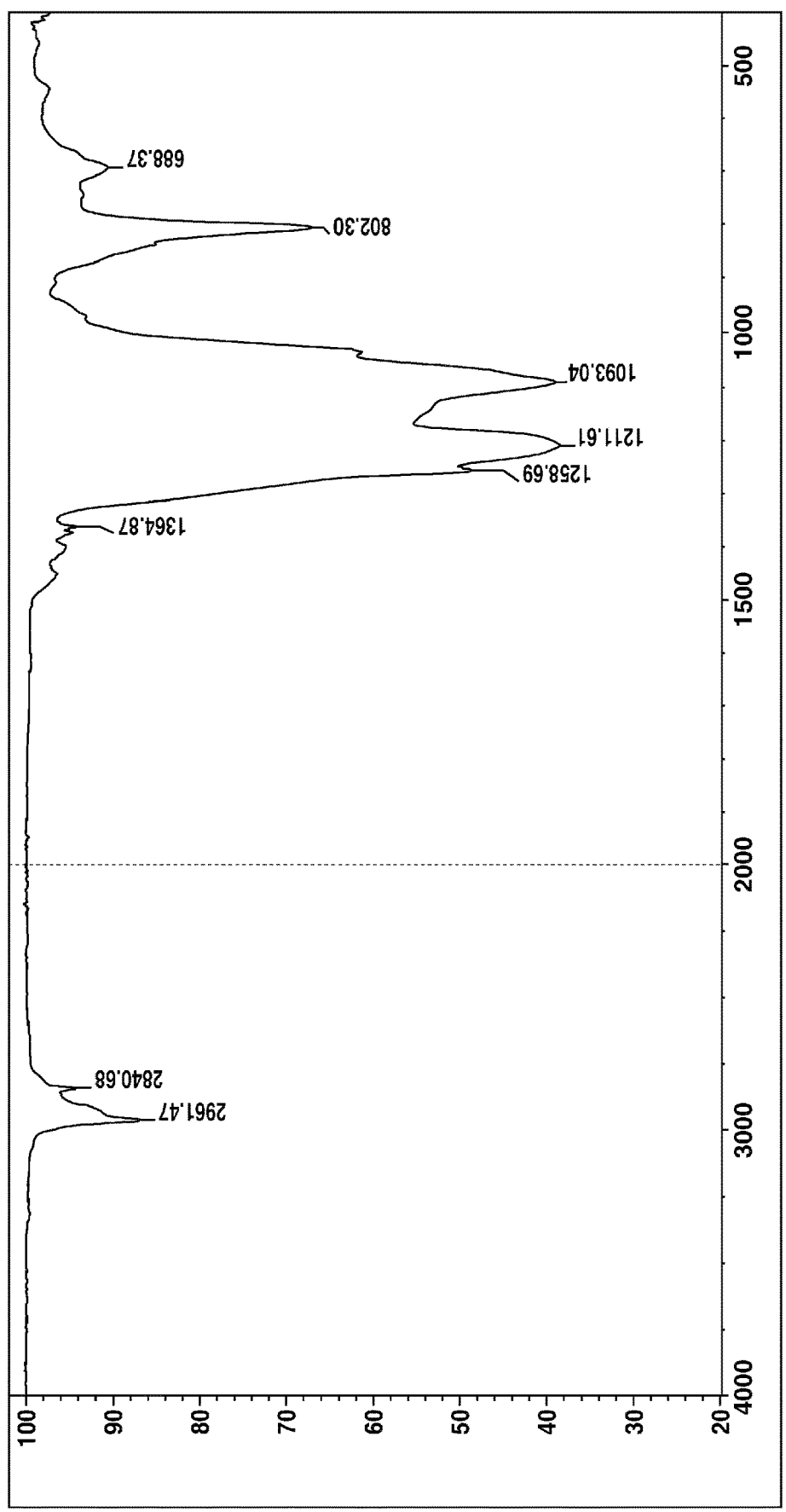
FIG. 6 is an IR spectrum of Diterminally Amine-Modified Perfluoropolyether Compound 3 obtained in Inventive Example 1-3.

Aside from changing the 2,2-dimethoxy-1-phenylazasilacylopentane to 2.88 g (0.0101 mol) of 2,2-dimethoxy-1-(2,2,6,6-tetramethyl-4-piperidinyl)-1-aza-2-silacylopentane, the reaction was carried out in the same way as in Inventive Example 1-1, giving 15.9 g of residue. The $^1$H-NMR and IR spectra of this residue are shown in FIGS. 5 and 6. The formation of Diterminally Amine-Modified Perfluoropolyether Compound 3 was confirmed from the disappearance of the Si—OH peaks and the appearance of peaks attributable to NH.

Inventive Example 1-4

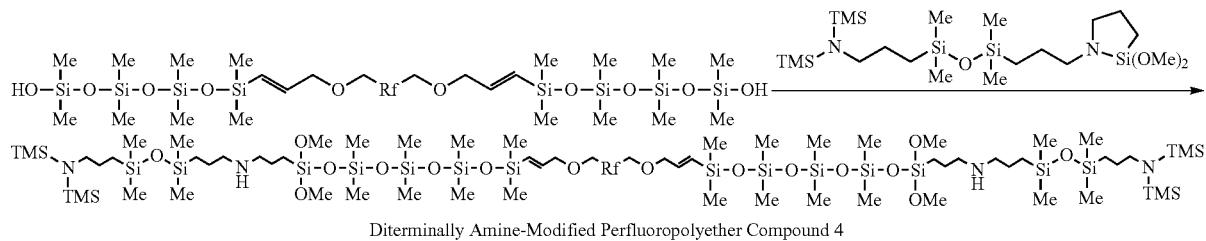

Diterminally Amine-Modified Perfluoropolyether Compound 4

(in the formulas, "TMS" stands for a trimethylsilyl group)

Figure 7:
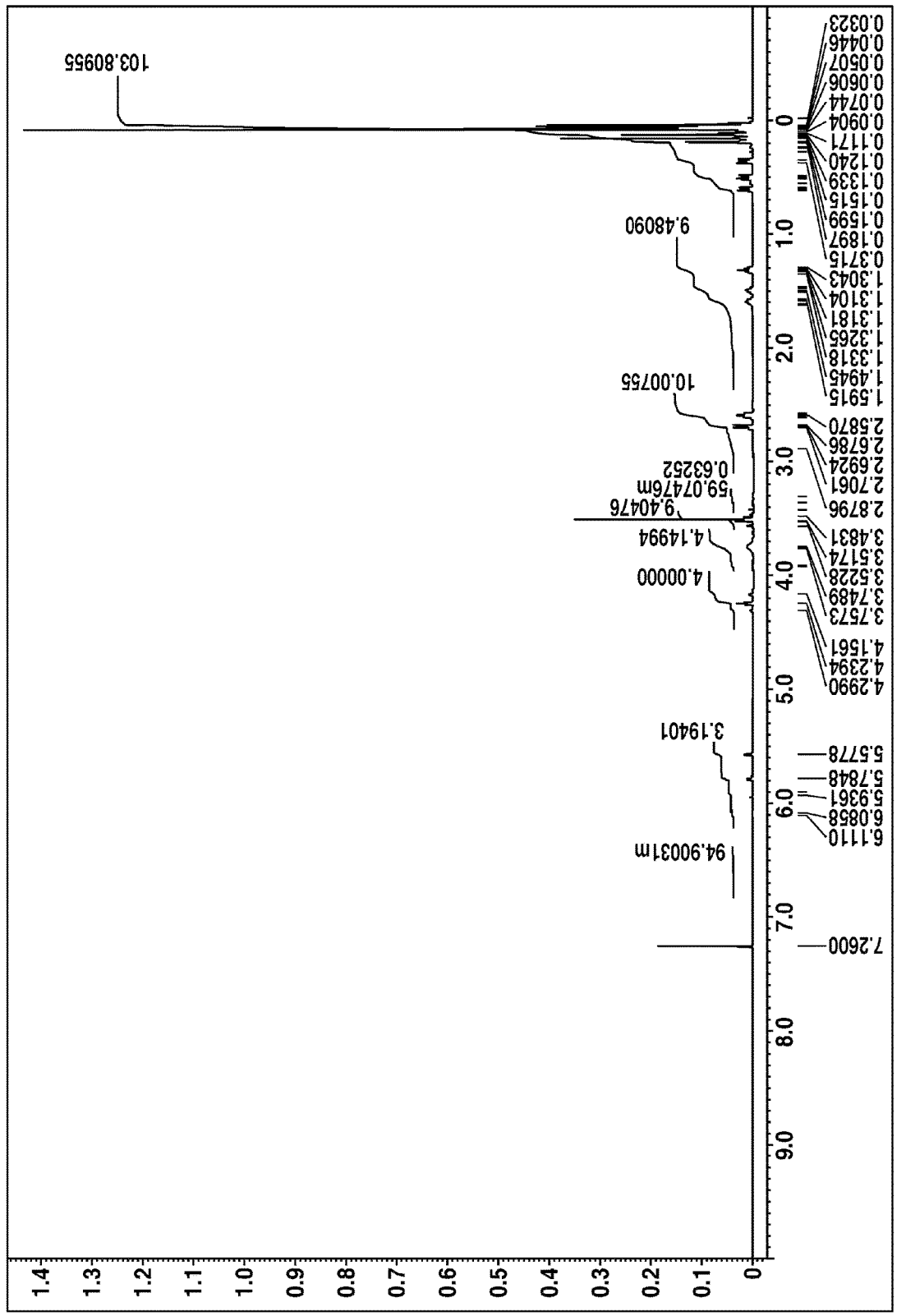
FIG. 7 is an $^1$H-NMR spectrum of Diterminally Amine-Modified Perfluoropolyether Compound 4 obtained in Inventive Example 1-4.
Figure 8:
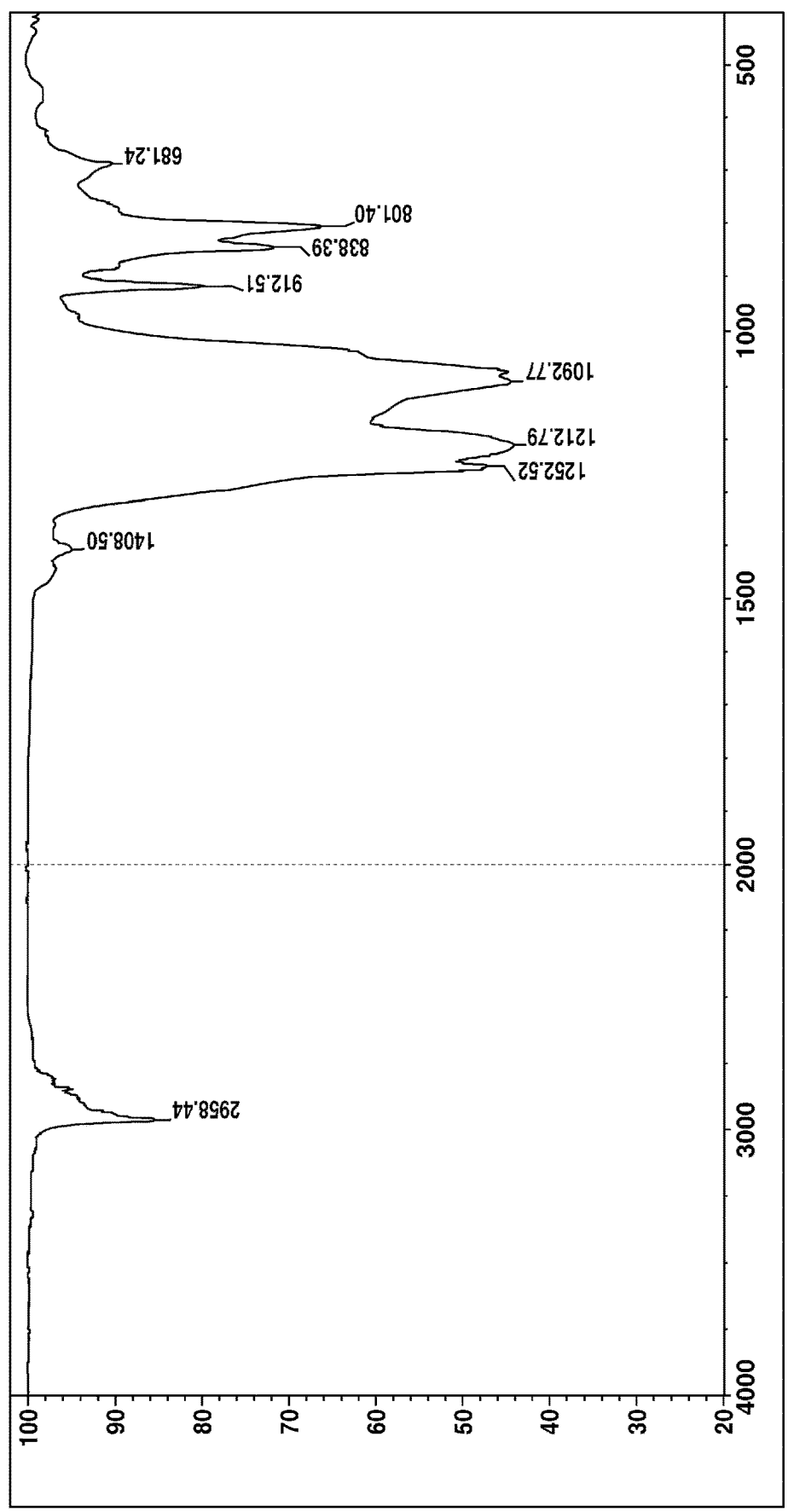
FIG. 8 is an IR spectrum of Diterminally Amine-Modified Perfluoropolyether Compound 4 obtained in Inventive Example 1-4.

Aside from changing the 2,2-dimethoxy-1-phenylazasilacylopentane to 5.27 g (0.0101 mol) of 2,2-dimethoxy-1-(1-bis(trimethylsilyl)aminopropyl-1,1,3,3-tetramethyldisiloxypropyl)azasilacyclopentane, the reaction was carried out in the same way as in Inventive Example 1-1, giving 19.2 g of residue. The $^1$H-NMR and IR spectra of this residue are shown in FIGS. 7 and 8. The formation of Diterminally Amine-Modified Perfluoropolyether Compound 4 was confirmed from the disappearance of the Si—OH peaks and the appearance of peaks attributable to NH.

Inventive Example 1-5

$$\text{HO-Si(Me)-O-Si(Me)-O-Si(Me)-O-Si(Me)=CH-CH}_2\text{-O-CH}_2\text{-O-Rf-O-CH}_2\text{-O-CH}_2\text{-CH=Si(Me)-O-Si(Me)-O-Si(Me)-O-Si(Me)-OH} \xrightarrow{(\text{EtO})_2\text{MeSi-CH}_2\text{CH}_2\text{CH}_2\text{-NH}_2}$$

$$\text{H}_2\text{N-CH}_2\text{CH}_2\text{CH}_2\text{-Si(Me)(OEt)-O-Si(Me)-O-Si(Me)-O-Si(Me)-O-Si(Me)=CH-CH}_2\text{-O-CH}_2\text{-O-Rf-O-CH}_2\text{-O-CH}_2\text{-CH=Si(Me)-O-Si(Me)-O-Si(Me)-O-Si(Me)-O-Si(Me)(OEt)-CH}_2\text{CH}_2\text{CH}_2\text{-NH}_2}$$

Diterminally Amine-Modified Perfluoropolyether Compound 5

(in the formulas, "Et" stands for an ethyl group)

Figure 9:
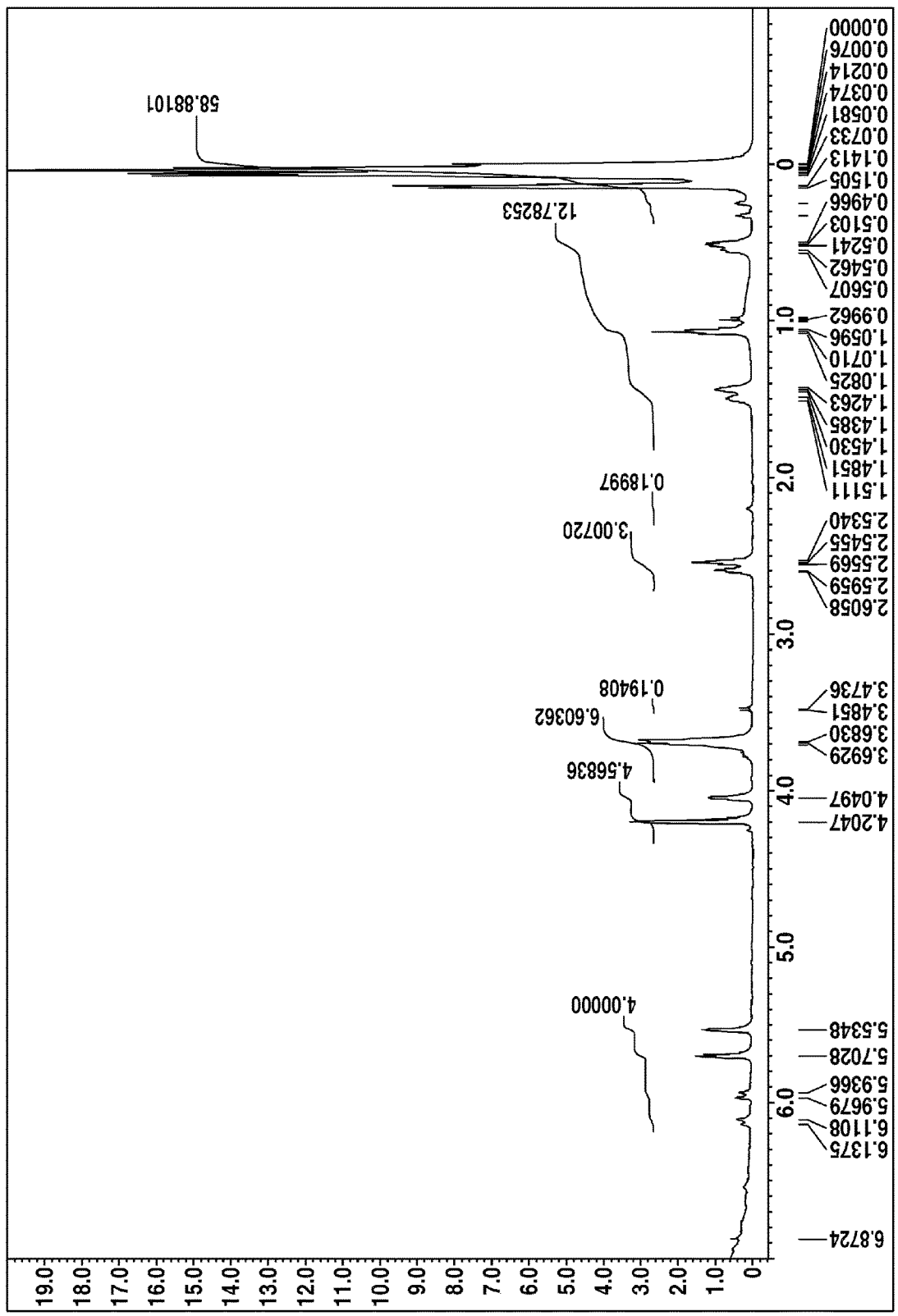
FIG. 9 is an $^1$H-NMR spectrum of Diterminally Amine-Modified Perfluoropolyether Compound 5 obtained in Inventive Example 1-5.
Figure 10:
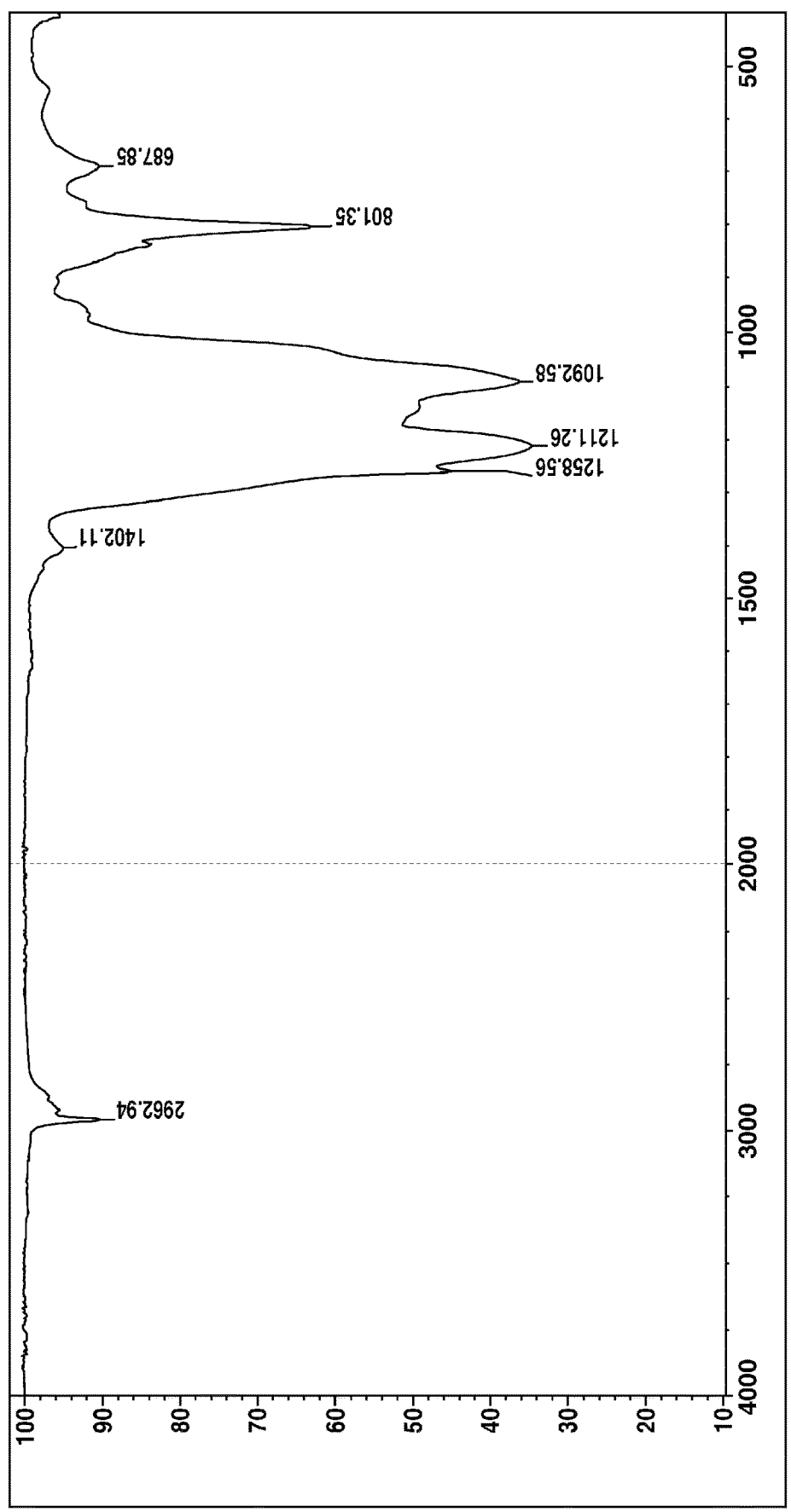
FIG. 10 is an IR spectrum of Diterminally Amine-Modified Perfluoropolyether Compound 5 obtained in Inventive Example 1-5.

The interior of a four-neck glass flask equipped with a stirrer, a thermometer and a reflux condenser was flushed with nitrogen, charged with 28.4 g of the diterminally silanol-modified perfluoropolyether compound-containing MXHF solution obtained in Synthesis Example 2 and 2.10 g (0.0110 mol) of 3-aminopropylmethyldiethoxysilane, and the flask contents were stirred at room temperature for 30 minutes. The resulting mixture was heated to 150° C. and the MXHF and ethanol were drawn off. The remaining MXHF, ethanol and 3-aminopropylmethyldiethoxysilane were then removed under reduced pressure, giving 15.2 g of residue. The $^1$H-NMR and IR spectra of this residue are shown in FIGS. 9 and 10. The formation of Diterminally Amine-Modified Perfluoropolyether Compound 5 was confirmed from the disappearance of the Si—OH peaks and the appearance of peaks attributable to NH.

The Diterminally Amine-Modified Perfluoropolyether Compounds 1 to 5 obtained above in Inventive Examples 1-1 to 1-5 were each mixed with a number of solvents to a concentration of 20 wt %, and the ability to prepare a uniform solution was visually rated in each case according to the following criteria. The results are shown in Table 1.

Good: A 20 wt % solution of uniform clarity could be prepared
NG: Due to clouding or separation, a 20 wt % solution could not be prepared As shown in Table 1, the diterminally amine-modified perfluoropolyether compounds of the invention exhibit good solubility in various solvents, regardless of whether they are polar solvents or nonpolar solvents.

Inventive Examples 2-1 and 2-2, Comparative Examples 2-1 and 2-2

The compounds used in the following Inventive Examples and Comparative Examples are shown below.

(1) Perfluoropolyether Compound

Diterminally Amine-Modified Perfluoropolyether Compound 1

(2) Resin

Isocyanate Resin 1: the aliphatic isocyanate resin TUL-100 (Asahi Kasei Corporation)
Isocyanate Resin 2: the aromatic isocyanate resin MR-200 (Tosoh Corporation)
Silicone resin: the methyl and methoxy group-containing hydrolyzable silicone compound KR-400N (Shin-Etsu Chemical Co., Ltd.)
Epoxy resin: KR-470 (see formula below; Shin-Etsu Chemical Co., Ltd.)

TABLE 1

| | | Solvent | | | | | |
|---|---|---|---|---|---|---|---|
| | Perfluoropolyether compound | 4-Methyl-tetrahydropyran | Ethyl acetate | Methyl ethyl ketone | Chloroform | Toluene | Isooctane |
| Inventive Example 1-1 | 1 | good | good | good | good | good | good |
| 1-2 | 2 | good | good | good | good | good | good |
| 1-3 | 3 | good | good | good | good | good | good |
| 1-4 | 4 | good | good | good | good | good | good |
| 1-5 | 5 | good | good | good | good | good | good |

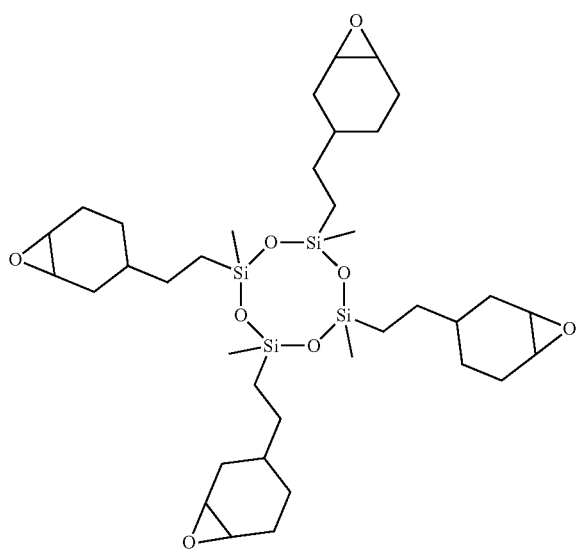 [SMILES: C[Si]1(CCC2CCC3OC3C2)O[Si](C)(CCC2CCC3OC3C2)O[Si](C)(CCC2CCC3OC3C2)O[Si](C)(CCC2CCC3OC3C2)O1]

(3) Polyol Compound: 1,4-butanediol (4) Curing Agent:
methylcyclohexen-1,2-dicarboxylic anhydride (See Formula Below

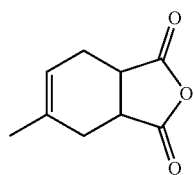

(5) Curing Catalyst

Curing Catalyst 1: 2-ethyl-4-methylimidazole

Curing Catalyst 2: DX-9740 (an aluminum compound from Shin-Etsu Chemical Co., Ltd.)

(6) Solvent

Solvent 1: 4-methyltetrahydropyran
Solvent 2: dipropylene glycol dimethyl ether

Liquid-repelling compositions were prepared by mixing together a perfluoropolyether compound, an isocyanate resin, a polyol compound and a solvent in the proportions shown in Table 2 below in such a way as to keep moisture from entering.

These liquid-repelling compositions were coated onto an aluminum plate (7 cm×15 cm) to a wet thickness of 30 μm with a bar coater, following which they were cured for 2 hours in an 80° C., 75% relative humidity environment to form cured films. The water repellency and oil repellency of the resulting cured films were measured and evaluated by the methods described below. The results are shown in Table 2.

Water Repellency:

The contact angle of a 2 μL drop of water and the sliding angle of a 50 μL drop of water were measured at room temperature with a contact angle goniometer (Kyowa Interface Science Co., Ltd.)

Oil Repellency:

The contact angle of a 5 μL drop of tetradecane was measured at room temperature with a contact angle goniometer (Kyowa Interface Science Co., Ltd.).

Also, the surface of the aluminum plate was written on with an oil-based marker (sold in Japan under the registered trademark "Magic Ink") and the writing was then wiped off with tissue paper and rated according to the following criteria.

Good: Writing could be removed and the substrate surface showed no change

NG: Writing could not be removed

TABLE 2

|  | Perfluoropolyether compound (pbw) | Resin (pbw) Isocyanate Resin 1 | Resin (pbw) Isocyanate Resin 2 | Polyol Compound (pbw) | Solvent (pbw) Solvent 1 | Water repellency Water contact angle (°) | Water repellency Water sliding angle (°) | Oil repellency Tetradecane contact angle (°) | Oil repellency Ink wipeability |
|---|---|---|---|---|---|---|---|---|---|
| Inventive Example 2-1 | 0.25 | 19.7 |  | 5.3 | 75 | 105 | 32 | 54 | Good |
| Inventive Example 2-2 | 0.25 |  | 18.3 | 6.7 | 75 | 104 | 25 | 53 | Good |
| Comparative Example 2-1 |  | 19.7 |  | 5.3 | 75 | 90 | 39 | 12 | NG |
| Comparative Example 2-2 |  |  | 18.3 | 6.7 | 75 | 89 | 34 | 15 | NG |

Inventive Example 3-1 and Comparative Example 3-1

Liquid-repelling compositions were prepared by mixing together a perfluoropolyether compound, an epoxy resin, a curing agent, a curing catalyst and a solvent in the proportions shown in Table 3 below in such a way as to keep moisture from entering.

These liquid-repelling compositions were coated onto a stainless steel (SUS 430) plate (7 cm×15 cm) to a wet thickness of 30 μm with a bar coater, following which they were cured for 4 hours in a 180° C. environment to form cured films. The water repellency and oil repellency of the resulting cured films were evaluated in the same way as described above. The results are shown in Table 3.

TABLE 3

| | Perfluoro-polyether compound (pbw) | Resin (pbw) Epoxy Resin | Curing agent (pbw) Acid Anhydride 1 | Curing Catalyst (pbw) Curing Catalyst 1 | Solvent (pbw) Solvent 1 | Water repellency Water contact angle (°) | Water sliding angle (°) | Oil repellency Tetradecane contact angle (°) | Ink wipeability |
|---|---|---|---|---|---|---|---|---|---|
| Inventive Example 3-1 | 0.5 | 28.6 | 21.4 | 0.5 | 50 | 109 | 32 | 59 | Good |
| Comparative Example 3-1 | | 28.6 | 21.4 | 0.5 | 50 | 80 | 25 | 17 | NG |

Inventive Examples 4-1 to 4-3 and Comparative Example 4-1

Liquid-repelling compositions were prepared by mixing together a perfluoropolyether compound, a silicone resin, a curing catalyst and a solvent in the proportions shown in Table 4 below in such a way as to keep moisture from entering.

These liquid-repelling compositions were coated onto a stainless steel (SUS 430) plate (7 cm×15 cm) to a wet thickness of 30 μm with a bar coater, following which they were cured for 1 hour in a 25° C./50% relative humidity environment to form cured films. The water repellency and oil repellency of the resulting cured films were evaluated in the same way as in the above examples. The results are shown in Table 4.

TABLE 4

| | Perfluoro-polyether compound (pbw) | Resin (pbw) Silicone resin | Curing catalyst (pbw) Curing Catalyst 2 | Solvent (pbw) Solvent 2 | Water-repellency Water contact angle (°) | Water sliding angle (°) | Oil repellency Tetradecane contact angle (°) | Ink wipeability |
|---|---|---|---|---|---|---|---|---|
| Inventive Example 4-1 | 20 | | | 80 | 109 | 15 | 58 | Good |
| Inventive Example 4-2 | 20 | | 1 | 80 | 109 | 12 | 58 | Good |
| Inventive Example 4-3 | 50 | 50 | | | 110 | 13 | 58 | Good |
| Comparative Example 4-1 | | 100 | 10 | | 87 | 32 | 33 | NG |

The results of the above Inventive Examples and Comparative Examples demonstrate that the diterminally amine-modified perfluoropolyether compounds of the invention, when combined and used together with an isocyanate resin, epoxy resin or the like, are able to impart cured films obtained therefrom with the high liquid repellency (water and oil repellency) of the perfluoropolyether groups. Moreover, cured films obtained from such a diterminally amine-modified perfluoropolyether compound alone or a mixture thereof with a silicone resin also exhibit the high liquid repellency of the perfluoropolyether groups.

Japanese Patent Application No. 2020-131637 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A diterminally amine-modified perfluoropolyether compound of general formula (1) below

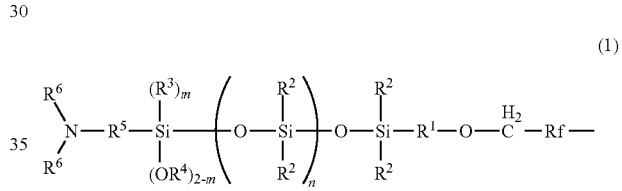

-continued

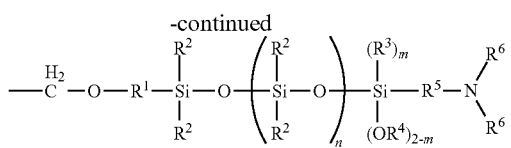

(wherein Rf is a perfluoropolyether group; each $R^1$ is independently an unsubstituted divalent hydrocarbon group of 1 to 10 carbon atoms; $R^2$, $R^3$ and $R^4$ are each independently substituted or unsubstituted monovalent hydrocarbon groups of 1 to 10 carbon atoms; each $R^5$ is independently an unsubstituted divalent hydrocarbon group of 1 to 10 carbon atoms; each $R^6$ is independently a hydrogen atom or a substituted or unsubstituted monovalent hydrocarbon group of 1 to 50 carbon atoms which may include at least one oxygen, nitrogen, sulfur or silicon atom; each occurrence of 'm' is independently 0, 1 or 2; and each occurrence of 'n' is independently an integer from 0 to 8).

2. The perfluoropolyether compound of claim 1, wherein each $R^1$ is independently a substituent of formula (5) or (6) below.

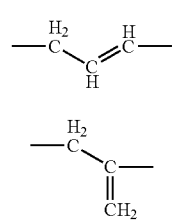

3. The perfluoropolyether compound of claim 1, wherein Rf is a divalent group of any one of general formulas (7) to (10) below

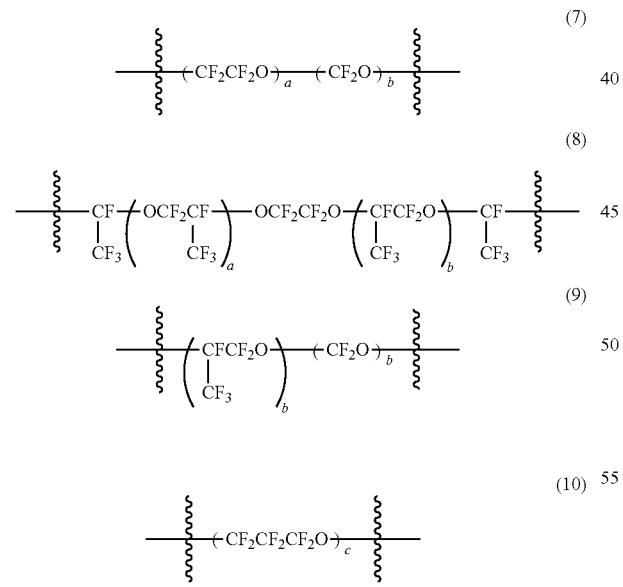

(wherein 'a' and 'b' are each independently an integer from 1 to 50, and 'c' is an integer from 1 to 150).

4. A method for preparing the diterminally amine-modified perfluoropolyether compound of claim 1, comprising the step of reacting a diterminally silanol-modified perfluoropolyether compound of general formula (2) below

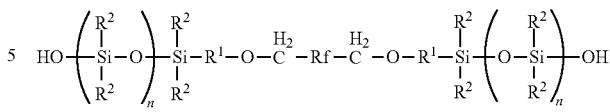

(wherein Rf, $R^1$, $R^2$ and n are as defined above) with a cyclic silazane structure-containing organoxysilane compound of general formula (3) below

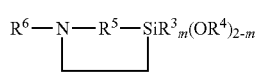

(wherein $R^3$ to $R^6$ and m are as defined above).

5. A method for preparing the diterminally amine-modified perfluoropolyether compound of claim 1, comprising the step of reacting a diterminally silanol-modified perfluoropolyether compound of general formula (2) below

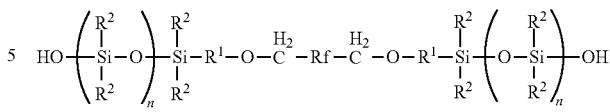

(wherein Rf, $R^1$, $R^2$ and n are as defined above) with an amino group-containing organoxysilane compound of general formula (4) below

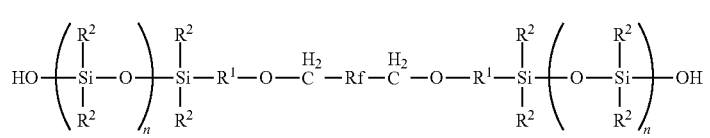

(wherein $R^3$ to $R^6$ and m are as defined above).

6. A liquid-repelling composition comprising the diterminally amine-modified perfluoropolyether compound of claim 1.

7. A cured product obtained by curing the liquid-repelling composition of claim 6.

8. A coated substrate comprising a substrate and a coating film formed thereon, wherein the coating film is formed with the liquid-repelling composition of claim 6.

* * * * *